US011422143B2

(12) United States Patent
Yamato et al.

(10) Patent No.: US 11,422,143 B2
(45) Date of Patent: Aug. 23, 2022

(54) SAMPLE MEASURING APPARATUS AND SAMPLE MEASURING METHOD

(71) Applicant: SYSMEX CORPORATION, Kobe (JP)

(72) Inventors: Takashi Yamato, Kobe (JP); Jun Inagaki, Kobe (JP); Shunsuke Saito, Kobe (JP); Yoshinori Nakamura, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 474 days.

(21) Appl. No.: 16/286,105

(22) Filed: Feb. 26, 2019

(65) Prior Publication Data
US 2019/0265264 A1 Aug. 29, 2019

(30) Foreign Application Priority Data
Feb. 27, 2018 (JP) .............................. JP2018-033636

(51) Int. Cl.
G01N 35/10 (2006.01)
G01N 35/00 (2006.01)

(52) U.S. Cl.
CPC ..... *G01N 35/1011* (2013.01); *G01N 35/0092* (2013.01); *G01N 35/10* (2013.01); *G01N 35/1004* (2013.01); G01N 2035/1006 (2013.01); G01N 2035/1025 (2013.01)

(58) Field of Classification Search
None
See application file for complete search history.

(56) References Cited

U.S. PATENT DOCUMENTS

| 2011/0223061 | A1* | 9/2011 | Oonuma | G01N 35/10 422/62 |
| 2012/0003731 | A1* | 1/2012 | Kuroda | G01N 35/00732 435/288.7 |
| 2018/0031591 | A1* | 2/2018 | Yaita | G01N 35/10 |
| 2020/0241025 | A1* | 7/2020 | Asakura | G01N 35/025 |

FOREIGN PATENT DOCUMENTS

| JP | 2002-040032 A | 2/2002 |
| JP | 2009-180605 A | 8/2009 |

OTHER PUBLICATIONS

Japanese Office Action dated Oct. 5, 2021 in a counterpart Japanese patent application No. 2018-033636.
Japanese Office Action dated Apr. 19, 2022 in a counterpart Japanese patent application No. 2018-033636.

* cited by examiner

*Primary Examiner* — Kathryn Wright
(74) *Attorney, Agent, or Firm* — Crowell & Moring LLP

(57) ABSTRACT

The sample measuring apparatus includes a suction unit that includes a nozzle and a drive unit that raises and lowers the nozzle, and suctions a first liquid and a second liquid that is different from the first liquid; a liquid surface detecting unit that detects liquid surfaces of the first liquid and the second liquid; a control unit that controls the suction unit, and a measuring unit that measures a measurement sample prepared from the suctioned first liquid; wherein the control unit controls the suction unit to suction the first liquid and the second liquid based on the respective liquid surface detection result of the first liquid and the second liquid detected while lowering the nozzle, and a second speed at which the nozzle descends when detecting the liquid surface of the second liquid is faster than a first speed at which the nozzle descends when detecting the liquid surface of the first liquid.

19 Claims, 19 Drawing Sheets

FIG. 3

| Parameters ||
|---|---|
| Items | Values |
| Sample dispensing operation | |
| Activation pulse speed f1 | 650 pps |
| Operation pulse speed f2 | 2000 pps |
| 1st height hS1 | 250 p l s |
| Depth hS0 corresponding to sample dispensing | 25 p l s |
| Liquid surface height LS | 300 p l s |
| Reagent dispensing operation (reagent initial liquid surface height detection operation) | |
| Activation pulse speed f1 | 650 pps |
| Operation pulse speed f2 | 2000 pps |
| 1st height hR1 | 250 p l s |
| Depth hR0 corresponding to reagent dispensing | 25 p l s |
| Liquid surface height LR after previous suction | 300 p l s |
| Liquid surface height | 300 p l s |
| 1st height R1-1 | 250 p l s |
| Cleaning operation | |
| Activation pulse speed f1 | 650 pps |
| Operation pulse speed f2 | 2000 pps |
| 2nd height hC2 | 300 p l s |
| Liquid surface height LC | 220 p l s |
| Liquid surface height normal range: lower limit | 280 p l s |
| Liquid surface height normal range: upper limit | 320 p l s |

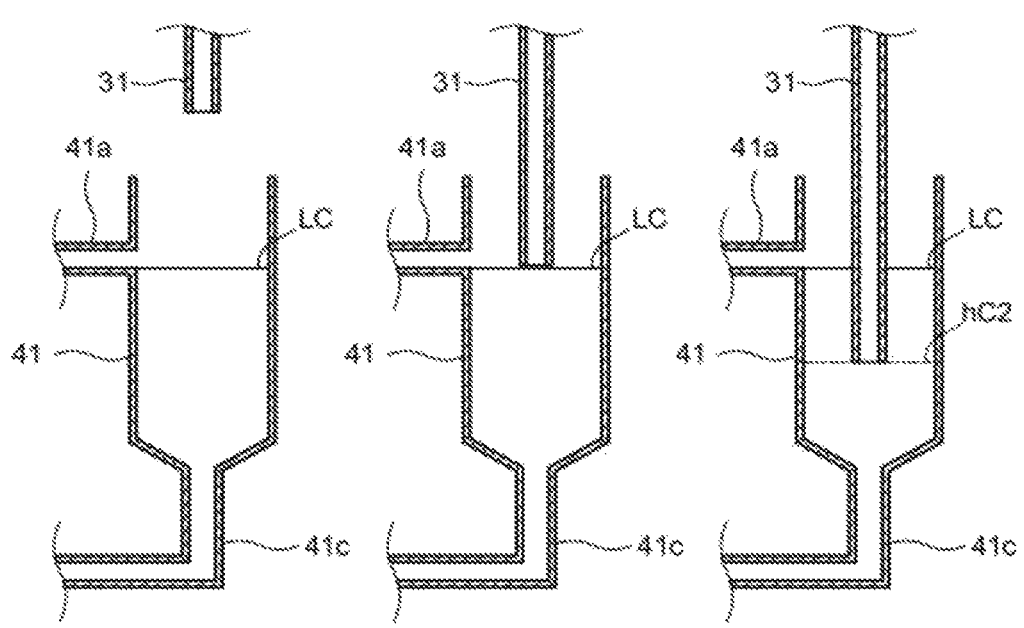

SAMPLE MEASURING APPARATUS AND SAMPLE MEASURING METHOD

RELATED APPLICATIONS

This application claims priority from prior Japanese Patent Application No. 2018-033636, filed on Feb. 27, 2018, entitled "Sample Measuring Apparatus and Sample Measuring Method", the entire contents of which are incorporated herein by reference.

BACKGROUND OF THE INVENTION

1. Field of the Invention

The present invention relates to a sample measuring apparatus and a sample measuring method for measuring a sample such as blood and the like.

2. Description of the Related Art

A sample measuring apparatus includes a working unit for suctioning a liquid via a nozzle from a container containing a liquid such as a sample or a reagent (see, for example, Japanese Patent Application Publication No. 2009-180605). In the sample measuring apparatus described in Japanese Patent Application No. 2009-180605, in order to suction a liquid such as a sample or a reagent, the switching height of the descending speed is set to be above the liquid surface height T1 of the liquid in the container 500, as shown in FIG. 19. The nozzle 501 descends at a high speed to the set switching height T2 of the descending speed, and the nozzle 501 then descends at a low speed from the switching height T2 of the descending speed and the nozzle 501 intrudes into the liquid.

When the nozzle descends to the liquid surface height T1, the sensor 502 detects the contact of the nozzle 501 with the liquid surface, and the liquid surface height T1 is obtained. Since the suction amount of the liquid and the shape of the container are known, the nozzle 501 enters the liquid by a depth corresponding to the suction amount of the liquid from the liquid surface height T1 and stops, and suction of the liquid is performed at that position.

In the sample measuring apparatus described in Japanese Patent Application Publication No. 2009-180605, the descending speed of the nozzle is set to a low speed from the switching height of the descending speed, such that the nozzle enters the liquid surface at a low speed and the liquid surface can be detected with high accuracy. On the other hand, it takes time to suction the liquid, which hinders the high speed measurement of the sample since the descending speed of the nozzle is switched to a low speed. Specifically, since suction of various kinds of liquid is performed in the sample measuring apparatus, it is difficult to measure at a high speed when suction is performed by switching the descending speed of the nozzle to a low speed for any liquid as in Japanese Patent Application Publication No. 2009-80605.

SUMMARY OF THE INVENTION

A first aspect of the present invention relates to a sample measuring apparatus. According to this aspect, a sample measuring apparatus (100) includes a suction unit that includes a nozzle (31) and a drive unit (37) that raises and lowers the nozzle (31), and suctions a first liquid and a second liquid that is different from the first liquid, a liquid surface detecting unit (35) that detects the liquid surface of the first liquid and the second liquid, a control unit (61a) that controls the suction unit, and a measurement unit (51) measures a measurement sample prepared from the suctioned first liquid, wherein the control unit (61a) controls the suction unit to suction the first liquid and the second liquid based on the respective liquid surface detection result of the first liquid and the second liquid detected while lowering the nozzle (31), and a second speed at which the nozzle (31) descends when detecting the liquid surface of the second liquid is faster than a first speed at which the nozzle (31) descends when detecting the liquid surface of the first liquid.

In the sample measuring apparatus, the nozzle is lowered to suction the first liquid and the second liquid. The applicant has found that some of the liquids to be suctioned in the sample measuring apparatus have little influence on the measurement result of the measurement sample even if the liquid surface detection accuracy is not precise. Therefore, in the present aspect, the speed at which the nozzle is lowered is different with respect to a first liquid having a high influence on the measurement accuracy of the liquid surface detection and a second liquid having less influence on the measurement accuracy of the liquid surface detection than the first liquid. When the tip of the nozzle comes into contact with the liquid surface of the first liquid, the fluctuation of the liquid surface is slight and the tip of the nozzle is unlikely to vibrate due to the impact of the contact since the nozzle is lowered at the first speed that is slower than the second speed with respect to the second liquid. Therefore, the liquid surface of the first liquid can be accurately detected as compared with the second liquid, and since a precise amount of the first liquid is suctioned, the measurement of the measurement sample prepared by the first liquid is performed accurately. On the other hand, since the influence of the second liquid on the measurement of the measurement sample is slight, it is unnecessary to suction an accurate amount of the second liquid as compared with the first liquid and precise detection of the liquid surface is unnecessary. Therefore, it is possible to lower the nozzle at a high speed with respect to the second liquid.

As described above, with respect to the first liquid having a high influence on the measurement accuracy of the liquid surface detection and the second liquid having a lesser influence on the measurement accuracy of the liquid surface detection smaller than the first liquid, it becomes possible to increase the speed of measurement by lowering the nozzle at a second speed that is faster than the first speed for the second liquid.

In the sample measuring apparatus according to this aspect, the second liquid may be a cleaning liquid for cleaning the nozzle (31).

Since the cleaning liquid is only required to wash the nozzle and has little influence on the measurement of the measurement sample, it is unnecessary to suction such a precise amount as compared to suctioning the first liquid.

In the sample measuring apparatus according to this aspect the control unit (61a) lowers the nozzle (31) in the acceleration/deceleration drive mode including a period of acceleration, constant speed, and deceleration with respect to the second liquid, and the liquid surface detecting unit (35) is caused to detect the liquid surface of the second liquid during the deceleration period of the acceleration/deceleration drive mode.

Although precise detection of the liquid surface of the second liquid has less influence on the measurement of the measurement sample, it is desirable to detect the liquid surface as accurately as possible. Therefore, liquid surface detection is performed during the deceleration period of descent of the nozzle.

The sample measuring apparatus according to this aspect includes a liquid storage unit (41, 42, 43, 44) for storing a fixed amount of the second liquid and a memory for storing a liquid surface height (hC2) of the second liquid in the liquid storage unit (41, 42, 43, 44), whereby that the control unit (61a) controls the liquid storage unit (41, 42, 43, 44) such that the nozzle (31) also may be lowered to the height (hC2) below the liquid surface of the fixed amount of the second liquid stored in the liquid storage unit (41, 42, 42, 44).

The second height is determined in advance by adding a predetermined margin value to the suction amount of the second liquid and stored in the storage unit; it is possible to reliably suction the second liquid by a predetermined amount by lowering the nozzle to the second height.

The sample measuring apparatus according to this aspect may further include a storage unit that stores the second height (hC2), and the control unit (61a) may lower the nozzle (31) to the second height (hC2) of the second liquid by the acceleration/deceleration drive mode that includes each period of acceleration, constant speed, and deceleration.

By lowering the nozzle to the second height by the acceleration/deceleration drive mode, it is possible to reach the second height at high speed.

In the sample measuring apparatus according to this aspect, the first liquid may be a sample or a reagent.

If the amounts of sample or reagent to be suctioned are different, the amount to be dispensed changes, and the reaction between the sample and the reagent necessary for measurement is affected. Therefore, the influence on the measurement result is large due to the difference between the suction amounts of the sample and the reagent, and suction an accurate suction amount is required.

In the sample measuring apparatus according to this aspect, the first liquid may be plasma separated by centrifuging whole blood contained in a sample container (10).

If the sample is blood plasma and the measurement is coagulation measurement, it is preferable to descend more cautiously. The reasons will be explained below. When the whole blood is centrifuged, a layer of platelets and white blood cells called buffy coat is formed between the plasma region and the erythrocyte region in the sample container. Incorporation of the buffy coat into the sample affects measurements related to blood coagulation tests and may cause false positives in analyses based on the measurements related to blood coagulation tests. When performing a blood coagulation test, the nozzle may descend too much when the nozzle is lowered at a high speed, that is, an overrun may occur, and however, nozzle overrun in the descent may be prevented by lowering the nozzle at a low speed and detecting the liquid surface. As a result, contamination by buffy coat relative to the sample used for coagulation measurement can be suppressed. Hence, measurement related to the blood coagulation test can be performed appropriately.

In the sample measuring apparatus according to this aspect, after the control unit (61a) controls the suction unit to lower the nozzle (31) by the acceleration/deceleration drive mode including acceleration, constant speed, and deceleration to the first liquid, the nozzle (31) then may be lowered at a fixed constant speed by the constant speed drive mode so that the liquid surface detecting unit (35) then detects the liquid surface of the first liquid during the lowering of the nozzle (31) by the constant speed drive mode.

It is possible to lower the nozzle quickly and accurately detect the liquid surface by lowering the nozzle at high speed by the acceleration/deceleration drive mode and thereafter lowering the nozzle by the low speed constant speed drive mode to detect the liquid surface.

The sample measuring apparatus according to this aspect further includes a memory for storing the first heights (hS1, hR1, hR1-1), and the control unit (61a) controls the suction unit to lower the nozzle (31) to the first height (hS1, hR1, hR1-1) by the acceleration/deceleration drive mode including acceleration, constant speed, then lowers the nozzle (31) from the first height (hS1, hR1, hR1-1) at constant speed by the constant speed drive mode.

The nozzle can be lowered at high speed by the acceleration/deceleration drive mode, and thereafter the nozzle can be lowered at low speed by the constant speed drive mode if the first height is set to be a position sufficiently apart from any level of the liquid surface of the first liquid and thereafter lower the nozzle (31) from the first height by switching the acceleration/deceleration drive mode to the constant speed drive mode, whereby the nozzle can be lowered quickly and the liquid surface can be detected accurately.

In the sample measuring apparatus according to this aspect, when the liquid surface detection result of the first liquid and the second liquid is within the predetermined range, the control unit (61a) may control the suction unit so as to suction the first liquid and the second liquid, respectively.

The predetermined amount can be reliably suctioned by performing suction only when the liquid surface height is within the predetermined range with respect to each of the first liquid and the second liquid.

In the sample measuring apparatus according to this aspect, the control unit (61a) also may output information indicating abnormality and/or stop the measurement by the measurement unit (51) when the liquid surface detection result of the first liquid or the second liquid is not within the predetermined range.

The operator can know of the abnormality of the liquid surface detection result. When the liquid surface detection result is not within the predetermined range, the nozzle cannot suction each liquid by a predetermined amount, and accurate measurement cannot be performed even when measurement is performed using the liquid suctioned by the nozzle. It is possible to prevent incorrect measurement from being performed by having the control unit stop the measurement.

In the sample measuring apparatus according to this aspect, a liquid storing unit (41, 42, 43, 44) for storing a fixed amount of a second liquid, a second liquid supply unit (41c) for supplying a fixed amount of second liquid to the liquid storage unit (41, 42, 43, 44), and a liquid discharge unit (41c) for discharging the second liquid stored in the liquid storage unit (41, 42, 43, 44) are provided, such that the control unit (61a) outputs information indicating a supply anomaly as abnormality information when the liquid surface detection result exceeds the lower limit of the predetermined range, and outputs information indicating a discharge abnormality of the second liquid as information indicating the abnormality when the liquid surface detection result of the second liquid exceeds the upper limit of the predetermined range.

The second liquid is stored in the liquid storage unit from the liquid supply unit at the time of cleaning the nozzle, and is discharged from the liquid discharge unit after the nozzle is cleaned. The control unit can detect a supply abnormality and a discharge abnormality of the second liquid by determining an appropriate predetermined range of the liquid surface of the second liquid.

The sample measuring apparatus according to this aspect is provided with a liquid storage unit (41, 42, 43, 44) for storing a fixed amount of cleaning liquid, and the control unit (61a) controls the suction unit so as to discharge the suctioned cleaning liquid into a liquid storage unit (41, 42, 43, 44).

It is possible to clean the flow path inside the nozzle by discharging after the nozzle suctions the cleaning liquid.

The sample measuring apparatus of this aspect also includes a liquid discharge unit (41c) for discharging the cleaning liquid stored in the liquid storage unit (41, 42, 43, 44) after the cleaning liquid is suctioned.

When the residual cleaning liquid from the liquid storage unit is not discharged after suctioning the cleaning liquid and the suctioned cleaning liquid is discharged from the nozzle, the cleaning liquid that contains contaminants of the flow path of the nozzle is returned to the inside of the liquid storage unit and the outer circumferential surface of the nozzle is contaminated. However, in the present aspect, after suctioning the cleaning liquid, the cleaning liquid is discharged from the liquid storage unit and thereafter the cleaning liquid suctioned from the nozzle is discharged, so that the discharged cleaning liquid is discharged from the bottom part of the liquid storage unit and does not contaminate the outer peripheral surface of the nozzle.

In the sample measuring apparatus according to this aspect, the drive unit (37) is a stepping motor, and the control unit (61a) uses the number of pulses of the pulse signals supplied to the stepping motor when the liquid surface is detected as the liquid surface detection result.

By driving the nozzle using the stepping motor, the number of pulses of the pulse signals supplied to the stepping motor can be used as a value corresponding to the liquid surface height.

In the sample measuring apparatus according to this aspect, the liquid surface detecting unit (35) detects the contact between the nozzle (31) and each of the first liquid and the second liquid, thereby detecting the liquid surface of each of the first liquid and the second liquid.

By detecting the contact between the tip of the nozzle and each of the first liquid and the second liquid, it is possible to reliably detect the liquid surface.

In the sample measuring apparatus according to this aspect, it is preferable that the liquid surface detecting unit (35) is an electrostatic capacitance sensor.

In the sample measuring apparatus according to this aspect, the first liquid is a sample or a reagent, the second liquid is a cleaning liquid for cleaning the nozzle (31); and, for the second liquid, the control unit (61a) controls the suction unit to lower the nozzle (31) by the acceleration/deceleration drive mode including each period of acceleration, constant speed, and deceleration and the liquid surface detecting unit detect the liquid surface of the second liquid during the deceleration period of the acceleration/deceleration drive mode, then after lowering the nozzle (31) by the acceleration/deceleration drive mode including acceleration, constant speed, and deceleration with respect to the first liquid, the nozzle (31) also may be lowered at a constant speed by the constant speed drive mode to detect the liquid surface of the first liquid during descending by the constant speed drive mode.

The speed at which the nozzle is lowered is different for the reagent or sample due to the large influence on the measurement accuracy of the liquid surface detection of the reagent or the sample, whereas the influence of the speed of descent of the nozzle on liquid surface detection relative to the cleaning liquid is less than that of the reagent or the sample. The liquid surface of the cleaning liquid is detected when the descent of the nozzle is by the deceleration period of the acceleration/deceleration drive mode, and the liquid surface of the sample or reagent is detected when the nozzle is lowered by the constant speed drive mode. As compared with a reagent or a sample, it is not necessary for the cleaning liquid to be suctioned an accurate amount, and the accuracy of detecting the liquid surface need not be high. Therefore, the second speed at which the nozzle descends at the time of detecting the liquid surface of the cleaning liquid can be faster than the first speed at which the nozzle descends when the liquid surface of the reagent or sample is detected.

The sample measuring apparatus according to this aspect includes a liquid storage unit (41, 42, 43, 44) for storing a fixed amount of the second liquid, the first liquid is a sample or a reagent, and the second liquid is a cleaning liquid for cleaning the nozzle (31), and the control unit (61a) may control the suction unit to lower the nozzle (31) to a second height (hC2) below the liquid surface of the fixed amount of the second liquid stored in the liquid storage unit (41, 42, 43, 44).

The cleaning liquid can be reliably suctioned by lowering the nozzle to the second height.

In the sample measuring apparatus according to this aspect, the liquid storage unit (41) may be a cleaning tank.

In the sample measuring apparatus according to this aspect, the liquid supply unit (41c) may be a pipe connected to the liquid storage unit (41).

In the sample measuring apparatus according to this aspect, the liquid discharge unit (41c) may be a pipe connected to the liquid storage unit (41).

A second aspect of the present invention relates to a sample measuring method. The sample measuring method according to this aspect includes step of suctioning a first liquid based on the liquid surface detection result of the first liquid detected while the nozzle (31) descends at a first speed, a step of suctioning a second liquid based on a liquid surface detection result of the second liquid detected while the nozzle (31) descends at a second speed that is faster than the first speed, and a step of measuring a measurement sample prepared with the suctioned first liquid.

According to the sample measuring method of this aspect, the nozzle is lowered at different speeds with respect to each of the first liquid for which measurement accuracy of liquid surface detection is highly influenced by the nozzle descent speed and the second liquid for which measurement accuracy of the liquid surface detection is less influenced than the first liquid, that is, it is possible to perform accurate measurement while speeding up the measurement of the second liquid by lowering the nozzle at a second speed faster than the first speed.

In the sample measuring method according to this aspect, it is preferable that the first liquid is a sample contained in a sample container.

In the sample measuring method according to this aspect, it is preferable that the first liquid is a reagent contained in a reagent container.

If the amounts of sample or reagent to be suctioned are different, the amount to be dispensed changes, and the reaction between the sample and the reagent necessary for measurement is affected. Therefore, the influence on the measurement result is large due to the difference in the suction amount of the sample and the reagent, hence, it is necessary to suction an accurate suction amount and accurate liquid surface detection is required.

In the sample measuring method according to this aspect, it is preferable that the second liquid is a cleaning liquid contained in a cleaning tank and used for cleaning the nozzle.

Since the cleaning liquid is only required to wash the nozzle and has little influence on the measurement of the measurement sample, it is unnecessary to suction such a precise amount as compared to suctioning the first liquid.

According to the present invention, it is possible to perform accurate measurement while speeding up the measurement.

BRIEF DESCRIPTION OF THE DRAWINGS

FIG. 3 is a diagram showing parameters stored in a storage unit;

FIG. 6A shows a state in which the nozzle is positioned right above the cleaning tank, FIG. 6B shows a state in which the nozzle is positioned on the liquid surface of the cleaning liquid, and FIG. 6C shows a state in which the nozzle is lowered to a second height;

DETAILED DESCRIPTION OF THE PREFERRED EMBODIMENTS

Figure 1:
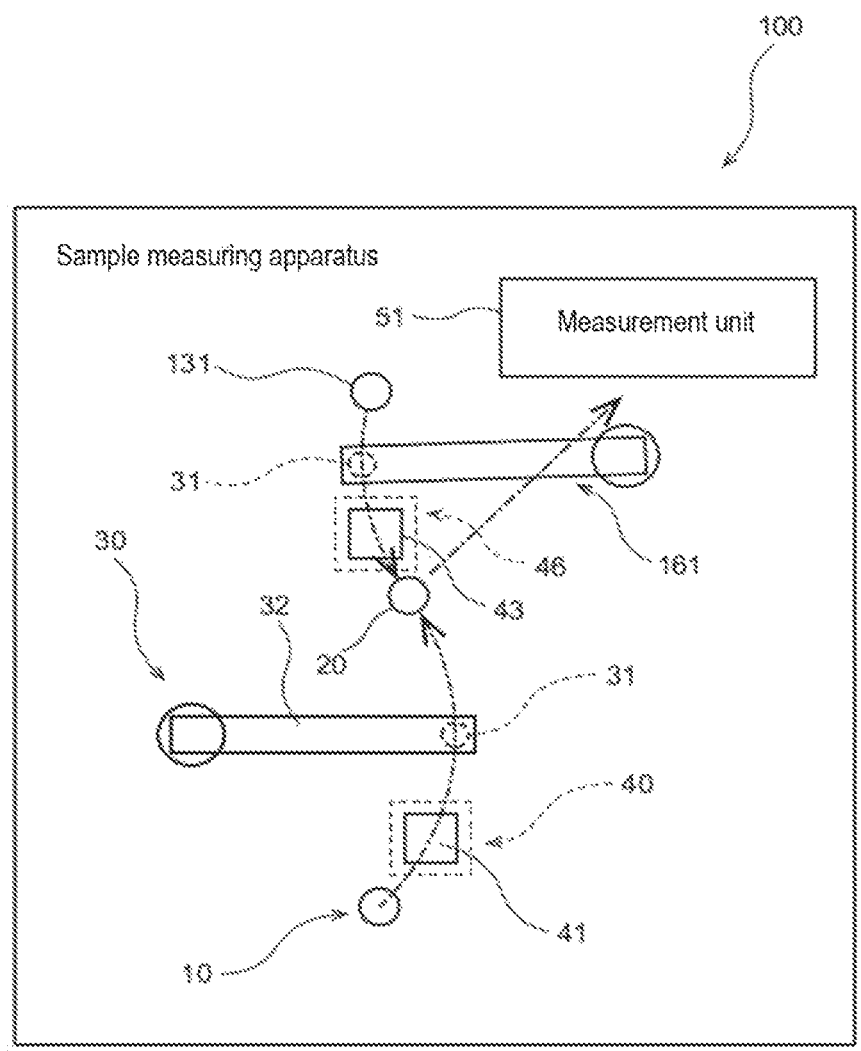
FIG. 1 is a diagram showing a schematic configuration of a sample measuring apparatus according to one embodiment.

A sample measuring apparatus 100 and a sample measuring method according to an embodiment will be described with reference to FIGS. 1 to 18. In FIG. 1, the XYZ axes are orthogonal to each other, and the Z axis positive direction corresponds to the vertically downward direction. Note that the XYZ axes are set in the same manner in the other figures as in FIG. 1.

Structure of Sample Measuring Apparatus 100

A schematic configuration of the sample measuring apparatus 100 will be described with reference to FIG. 1. The sample measuring apparatus 100 measures the sample contained in the sample container 10. In one example, the sample measuring apparatus 100 is a blood coagulation measuring apparatus, the sample is whole blood or plasma, and the sample container 10 is a blood collection tube. The sample measuring apparatus 100 includes a sample dispensing mechanism 30, a reagent dispensing mechanism 161, cleaning mechanisms 40 and 46, and a measuring unit 51. The sample dispensing mechanism 30 dispenses a sample from the sample container 10, for example, to another container 20 which is a cuvette, and is provided with a nozzle 31 and an arm 32. The nozzle 31 is configured by a suction tube to be capable of suctioning and discharging a sample. A nozzle 31 is provided at the end of the arm 32, and the arm 32 is configured to be pivotable. The reagent dispensing mechanism 161 dispenses the reagent from the reagent container 131 to another container 20. The cleaning mechanism 40 is for cleaning the nozzle 31 of the sample dispensing mechanism 30 and includes a cleaning tank 41, a mechanism for supplying a cleaning liquid and cleaning water to the cleaning tank 41, and a mechanism for supplying cleaning liquid and cleaning water into the nozzle 31. The cleaning mechanism 46 is for cleaning the nozzle 31 of the reagent dispensing mechanism 161 and includes a cleaning tank 43. Other structures are the same as those of the cleaning mechanism 40.

When the sample container 10 is positioned at a predetermined position, the sample dispensing mechanism 30 turns the arm 32 to position the nozzle 31 just above the sample container 10. Subsequently, the sample dispensing mechanism 30 lowers the arm 32 to lower the nozzle 31, and suctions the sample in the sample container 10 from the tip 31a of the nozzle 31.

When the sample is suctioned, the sample dispensing mechanism 30 raises the arm 32 to raise the nozzle 31. Subsequently, the sample dispensing mechanism 30 rotates the arm 32 to position the nozzle 31 just above the other container 20, and lowers the arm 32 to insert the tip of the nozzle 31 into the other container 20. Then, the sample dispensing mechanism 30 discharges the sample suctioned from the sample container 10 to another container 20.

Thereafter, a predetermined reagent is added to the sample discharged to the other container 20 by the reagent dispensing mechanism 161. The reagent dispensing mechanism 161 swivels the arm 32 to position the nozzle 31 just above the reagent container 131. Subsequently, the reagent dispensing mechanism 161 lowers the arm 32 to lower the nozzle 31 and suctions the reagent in the reagent container 131 from the tip 31a of the nozzle 31.

When the reagent is suctioned, the reagent dispensing mechanism 161 raises the arm 32 to raise the nozzle 31. Subsequently, the reagent dispensing mechanism 161 positions the nozzle 31 just above the other container 20 containing the sample, lowers the arm 32, inserts the tip 31a of the nozzle 31 into another container 20, and the reagent container 131 suctioned from the reagent container 131 is discharged to another container 20.

The sample to which the reagent is added is transferred to the measurement unit 51 as a measurement sample, and, for example, measurement relating to the blood coagulation test is performed.

After dispensing the sample from the sample container 10 to the other container 20, the sample dispensing mechanism 30 rotates the arm 32 to position the nozzle 31 just above the cleaning tank 41. Then, the nozzle 31 is lowered to insert the tip 31a of the nozzle 31 into the cleaning tank 41. The cleaning mechanism 40 supplies the cleaning liquid to the cleaning tank 41 to clean the outer peripheral surface of the nozzle 31 that has entered the cleaning liquid and the nozzle 31 suctions and discharges the cleaning liquid to clean the flow path 31b in the nozzle 31. Cleaning of the nozzle 31 is performed for each suction of different samples.

Similar to the sample dispensing mechanism 30, the reagent dispensing mechanism 161 which has dispensed reagent from the reagent container 131 to the other container 20 then cleans the outer peripheral surface of the flow path 31b in the nozzle 31 by the cleaning mechanism 43 having the cleaning tank 46. Cleaning of the nozzle 31 is performed for each suction of different reagents.

Circuit Structure of Sample Measuring Apparatus 100

Figure 2:
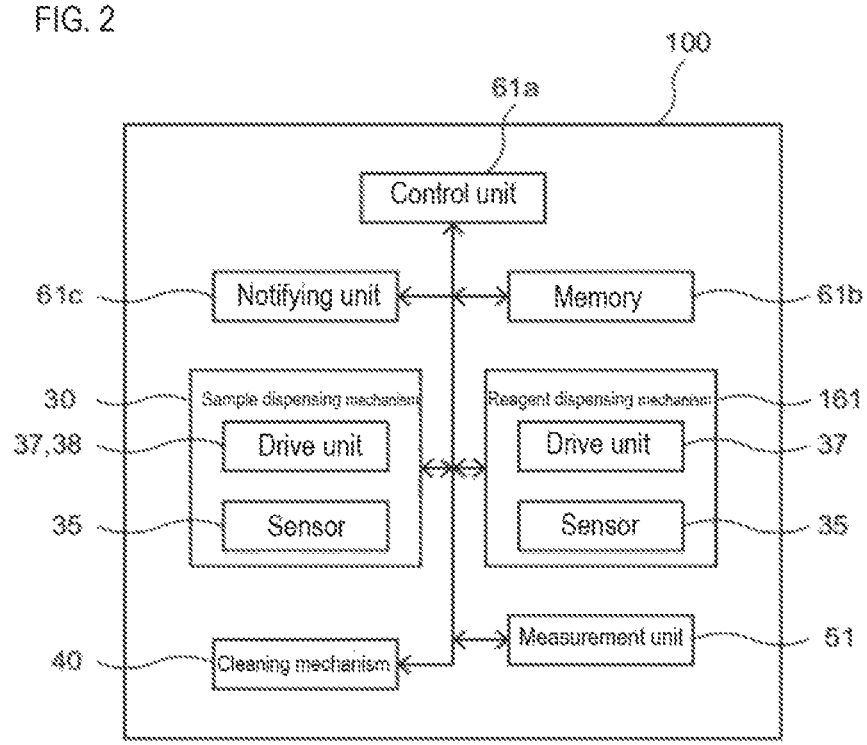
FIG. 2 is a diagram showing a circuit configuration of a sample measuring apparatus.

FIG. 2 is a block diagram showing a schematic circuit structure of the sample measuring apparatus 100. The circuit structure of FIG. 2 shows the structure described with reference to FIG. 1. The sample measuring apparatus 100 includes a sample dispensing mechanism 30, a reagent dispensing mechanism 161, a cleaning mechanism 40, a measuring unit 51, a control unit 61a, a storage unit 61b, and a notifying unit 61c. The sample dispensing mechanism 30 includes drive units 37 and 38 for lowering and turning the nozzle 31, a sensor 35 for liquid surface detection and the like. The reagent dispensing mechanism 161 includes a drive unit 37 for lowering the nozzle 31, a sensor 35 and the like. The cleaning mechanism 40 includes a mechanism such as a pump for supplying cleaning liquid and cleaning water to the nozzle 31 and the cleaning tank 41. In this embodiment, the drive units 37 and 38 include a stepping motor.

The control unit 61a is configured by a CPU, executes a program stored in the storage unit 61b, and controls each mechanism via an input/output interface. The control unit 61a causes the sample dispensing mechanism 30 to perform a sample dispensing operation to be described later, and causes the reagent dispensing mechanism 161 to perform a reagent dispensing operation to be described later. As will be described later, the control unit 61a also causes the cleaning mechanism 40 to perform a cleaning operation of the nozzle 31 of the sample dispensing mechanism 30 whose sample dispensing operation has been completed, whereby the reagent dispensing mechanism 161 nozzles 31 are cleaned. The storage unit 61b is configured by a ROM, a RAM, a hard disk and the like that stores a program to be executed by the control unit 61a, and stores a sample dispensing operation, a reagent dispensing operation, an initial liquid surface height of a reagent detection operation, and the parameters required for the cleaning operation. The parameter includes items and values corresponding to items, and the values corresponding to the item shown in FIG. 3 is an example thereof. The notifying unit 61c notifies the abnormality at the time of abnormal operation of each operation.

Summary of Sample Dispensing Operation

Figure 4A:
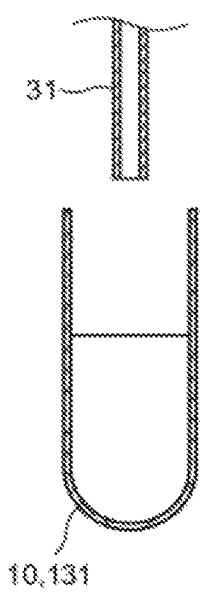
FIG. 4A shows a state in which the nozzle is positioned right above the sample container.
Figure 4B:
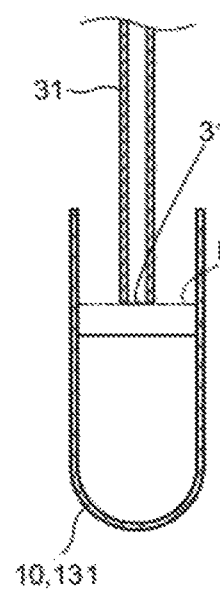
FIG. 4B shows a state in which the nozzle is positioned at a first height.

The summary of the sample dispensing operation is described below. As shown in FIG. 4A, after positioning the nozzle 31 of the sample dispensing mechanism 30 just above the sample container 10, the control unit 61a lowers the nozzle 31 to a first height hS1 in the acceleration/deceleration drive mode as shown in FIG. 4B. The first height hS1 is determined according to the sample, and is stored in advance in the storage unit 61b. Below the first height hS1, the lowering speed of the nozzle 31 is switched, and the nozzle 31 is lowered in the constant speed drive mode. The first height hS1 is a height at which the lowering mode of the nozzle 31 is switched from the acceleration/deceleration drive mode to the constant speed drive mode, and is set such that the nozzle 31 reliably descends in the constant speed drive mode to be a position sufficiently above the liquid surface height of the sample. The first height hS1 is recorded as the number of pulses supplied to the stepping motor when the nozzle 31 is lowered to the first height hS1 stored in the storage unit 61b. For example, in the example shown in FIG. 3, the first height hS1 is 250 pulses (pls).

Figure 4C:
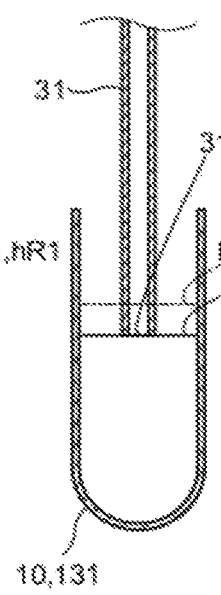
FIG. 4C shows a state in which the nozzle is in contact with the liquid surface of the sample.

As shown in FIG. 4C, when the control unit 61a detects that the tip 31a of the nozzle 31 has come into contact with the liquid surface of the sample via the sensor 35, the control unit 61a calculates the number of pulses supplied to the stepping motor of the drive unit 37, that is, the number of pulses corresponding to the liquid surface height LS at that time point is stored in the storage unit 61b. In the example shown in FIG. 3, the liquid surface height LS is 300 pulses (pls).

Figure 4D:
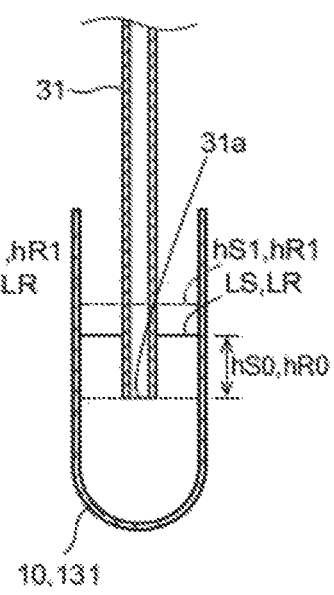
FIG. 4D shows a state in which the nozzle is lowered to a depth corresponding to the dispensing amount of the sample.

As shown in FIG. 4D, the control unit 61a lowers the nozzle 31 to a further lower position from the liquid surface height LS to a depth hS0 corresponding to the dispensing amount of the sample and suctions the sample. The depth hS0 corresponding to the dispensing amount of the sample varies depending on the type of sample and is stored in advance in the storage unit 61b. The depth hS0 corresponding to the dispensing amount of the sample is the depth at which the nozzle 31 is lowered from the detected liquid surface height LS, and is determined in advance by adding a predetermined margin value to the amount of the sample to be suctioned and is known from the amount of the sample accommodated in the sample container 10, the amount of the sample to be suctioned, and the shape of the sample container 10. The depth hS0 corresponding to the dispensing amount of the sample is recorded in the storage unit 61b as the pulse number supplied to the stepping motor when the nozzle 31 is lowered further from the liquid surface height LS to the depth hS0 corresponding to the dispensing amount of the sample, and in the example shown in FIG. 3, the depth hS0 corresponding to the dispensing amount of the sample is 25 pulses (pls).

"Acceleration/deceleration drive mode" refers to a mode in which the nozzle 31 and the stepping motor are driven at a speed of accelerating and decelerating so as to include each period of acceleration, constant speed, and deceleration. The "constant speed drive mode" refers to a mode in which the nozzle 31 and the stepping motor are driven at a constant speed with respect to time. The nozzle 31 is driven by a stepping motor configuring the drive unit 37, and the number of pulses supplied to the stepping motor is proportional to the distance by which the nozzle 31 descends. Therefore, the nozzle 31 is lowered in the acceleration/deceleration drive mode and the constant speed driving mode by driving the stepping motor in the acceleration/deceleration drive mode and the constant speed driving mode. For example, when one pulse is supplied to the stepping motor, the nozzle 31 descends by 0.12 mm.

Figure 5A:
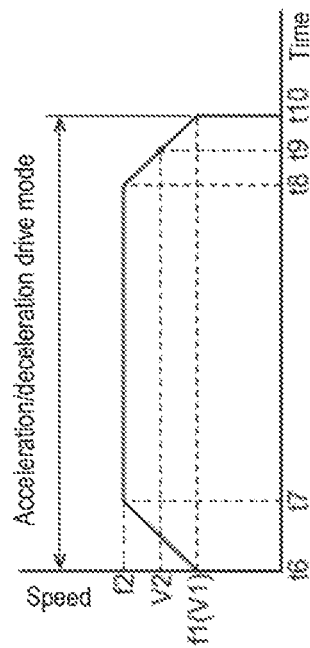
FIG. 5A is an illustration of a change in speed of a stepping motor in a sample dispensing operation.

FIG. 5A is a diagram showing an example of the change in the speed of the stepping motor in the sample dispensing operation. The control unit 61a drives the stepping motor in the acceleration/deceleration drive mode from the time t0 at which the nozzle 31 begins to descend to the time t3 at which the tip 31a of the nozzle 31 reaches the first height hS1, and from the time t3 the nozzle 31 is lowered in the constant speed drive mode until time t5 when the tip 31a of the nozzle 31 reaches a position obtained by subtracting the depth hS0 corresponding to the dispensing amount of the sample from the liquid surface height LS of the sample.

After the acceleration/deceleration drive mode actuates the stepping motor at the start pulse speed f1 at time t0 and drives the nozzle 31, an acceleration period is provided to gradually increase the operation pulse speed to accelerate; and after the stepping motor reaches the operation pulse speed f2 at the time t1, the constant speed operation of the operation pulse speed f2 is performed, and a deceleration period is provided from the time t2 to gradually decrease the pulse speed, and the stepping motor reaches and is driven at the start pulse speed f1 at the time t3. In the example shown in FIG. 3, the starting pulse speed ft is 650 pps (pulse number per second) and the operating pulse speed f2 is 2000 pps (pulse number per second).

In the constant speed drive mode, the stepping motor is driven at a constant speed without providing the acceleration/deceleration period; in this embodiment, from the time t3 when the stepping motor reaches the start pulse speed f1 after the acceleration/deceleration drive mode ends, the stepping motor drives at the constant speed of the starting pulse speed f1 until the time t5, and instantly stops the operation at the time t5.

The starting pulse speed f1 is set in a region (self-starting region) lower than the maximum starting speed of the stepping motor, and the operating pulse speed f2 is set to a higher speed side (through region) than the maximum self-starting speed.

The control unit 61a drives the stepping motor so that the tip 31a of the nozzle 31 comes into contact with the liquid surface of the sample while driving in the constant speed drive mode from the time t3 to the time t5. The speed at the time t4 when the tip 31a of the nozzle 31 comes into contact with the liquid surface of the sample is referred to as a first speed V1. The first speed V1 is the same speed as the starting pulse speed f1.

Summary of Reagent Dispensing Operation

Next, a summary of the reagent dispensing operation will be described. As shown in FIG. 4A, after positioning the nozzle 31 of the reagent dispensing mechanism 161 immediately above the reagent container 131, the control unit 61a lowers the nozzle 31 in the acceleration/deceleration drive mode to a first height hR1 set according to the reagent surface height LR of the acceleration/deceleration drive mode, as shown in FIG. 4B. Below the first height hR1, the lowering speed of the nozzle 31 is switched, and the nozzle 31 is lowered by the constant speed drive mode slower than the acceleration/deceleration drive mode. Note that the acceleration/deceleration drive mode and the constant speed drive mode are described in the same manner as the acceleration/deceleration drive mode and the constant speed drive mode of the sample dispensing operation. The first height hR1 is a height at which the descent mode of the nozzle 31 is switched from the acceleration/deceleration drive mode to the constant speed drive mode. The first height hR1 is recorded in the storage unit 61b as the number of pulses supplied to the stepping motor when the nozzle 31 is lowered to the first height hR1. For example, in the example shown in FIG. 3 the first height hR1 is 250 pulses (pls).

In the previous reagent dispensing operation, when the sensor 35 detects that the tip 31a of the nozzle 31 has come into contact with the liquid surface of the sample, the control unit 61a calculates a liquid surface height LR after the suction of the previous operation by subtracting a height corresponding to the suction amount of the reagent from the liquid surface height LR and stores this value in the storage unit 616b. In the present reagent dispensing operation, a position a predetermined distance above the liquid surface height LR after the last suction stored in the storage unit 61b is set as the first height hR1. In this way the distance by which the nozzle 31 descends in the acceleration/deceleration drive mode can be changed according to the liquid surface height LR, and the dispensing operation of the reagent can be performed at high speed. The liquid surface height LR after the last suctioning is recorded as the number of pulses supplied to the stepping motor when the nozzle 31 is lowered to the first height hR1 in the storage unit 61b. For example, in the example shown in FIG. 3, the liquid surface height LR after the last suctioning is 300 pulses (pls).

As shown in FIG. 4C, when the sensor 35 detects that the tip 31a of the nozzle 31 has come into contact with the liquid surface of the reagent, the control unit 61a calculates the number of pulses supplied to the stepping motor of the drive unit 37, that is, the number of pulses corresponding to the liquid surface height LR at that point, which is then stored in the storage unit 61b. In the example shown in FIG. 3, the liquid surface height LR is 300 pulses (pls).

As shown in FIG. 4D, the control unit 61a lowers the nozzle 31 further downward from the liquid surface height LR to a depth hR0 corresponding to the dispensing amount of the reagent. The depth hR0 corresponding to the dispensing amount of the reagent varies depending on the type of the reagent, and is stored in advance in the storage unit 61b. The depth hR0 corresponding to the dispensing amount of the reagent is the depth at which the nozzle 31 is lowered from the detected liquid surface height LR, and is determined in advance by adding a predetermined margin value to the suction amount of the reagent and is known from the amount of reagent contained in the reagent container 131, the suction amount of the reagent, and the shape of reagent container 131. The depth hR0 corresponding to the dispensing amount of the reagent is supplied to the stepping motor when the nozzle 31 is lowered from the liquid surface height LR to the depth hR0 corresponding to the dispensing amount of the reagent stored in the storage unit 61b, and in the example shown in FIG. 3, the depth hR0 corresponding to the dispensing amount of the reagent is 25 pulses (pls).

As described above, the liquid surface height LR of the reagent for setting the first height hR1 is obtained by reducing the height in accordance with the suction amount of the reagent from the liquid surface height when detecting the liquid surface in the previous reagent dispensing operation. Therefore, once the reagent dispensed, high-speed reagent dispensing operation can be performed thereafter. However, immediately after the sample measuring apparatus 100 is started or when the reagent container 131 is exchanged after activation, information on the liquid surface height LR of each reagent container 131 has not been stored in the storage unit 61b, and erroneous information may be stored in some cases. Therefore, when detecting that the sample measuring apparatus 100 is activated or immediately after the replacement of the reagent container 131, the control unit 61a performs an operation to detect the liquid surface height LR of the reagent relative to the reagent container 131 containing the reagent to be used (hereinafter referred to as "initial liquid surface height detecting operation") and the acquired liquid surface height LR of the reagent is stored in the storage unit 61b. In the initial liquid surface height detecting operation, the control unit 61a switches between the acceleration/deceleration drive mode and the constant speed drive mode at a predetermined first height hR1-1. The first height hR1-1 is recorded as the number of pulses supplied to the stepping motor when the nozzle 31 is lowered to the first height hR1-1 stored in the storage unit 61b. For example, in the example shown in FIG. 3, the first height hR1-1 is 250 pulses (pls).

Summary of Cleaning Operation

Next, a summary of the cleaning operation will be described. As shown in FIG. 6A, the control unit 61a lowers the nozzle 31 in the acceleration/deceleration drive mode after placing the nozzle 31 of the sample dispensing mechanism 30 just above the cleaning tank 41 of the cleaning mechanism 40. As shown in FIG. 6B, when the sensor 35 detects that the tip 31a of the nozzle 31 has come into contact with the liquid surface of the cleaning liquid, the control unit 61a calculates the number of pulses supplied to the stepping motor of the drive unit 37, that is, the number of pulses corresponding to the liquid surface height LC at that time point, is stored in the storage unit 61b. In the example shown in FIG. 3, the liquid surface height LC is 220 pulses (pls).

As shown in FIG. 6C, the control unit 61a lowers the nozzle 31 further to the second height hC2. The second height hC2 is stored in the storage unit 61b as the number of pulses supplied to the stepping motor when the nozzle 31 is lowered to the second height hC2. Since the second height hC2 is a predetermined height, and since the amount of the cleaning liquid stored in the cleaning tank 41, the suction amount of the cleaning liquid, and the shape of the cleaning tank 41 are known, the height minus the height corresponding to the suction amount of the cleaning liquid and the height of the predetermined margin value are predetermined in the height position of the cleaning liquid contained in the cleaning tank 41. Note that the suction amount of the cleaning liquid is set to be greater than the suction amount of the sample and the reagent. In the example shown in FIG. 3, the second height hC2 is 300 pulses (pls).

The control unit 61a determines whether the number of pulses corresponding to the liquid surface height LC is within a predetermined range indicating that the liquid surface height stored in the storage unit 61b is normal and, if the height LC is within this range, the cleaning liquid is suctioned. When the liquid surface height LC is not within the predetermined range, the notifying unit 61c notifies of the abnormality. In the example shown in FIG. 3, the lower limit value of the normal range of the liquid surface height is 280 pulses (pls), and the upper limit value of the normal range of the liquid surface height is 320 pulses (pls).

Figure 5B:
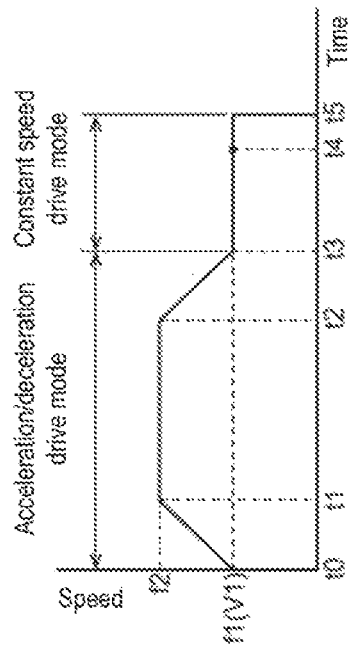
FIG. 5B is an illustration of a change in speed of a stepping motor in a cleaning operation.

The acceleration/deceleration drive mode of the cleaning operation is described in the same manner as the acceleration/deceleration drive mode of the sample dispensing operation. FIG. 5B is a diagram showing an example of the change in the speed of the stepping motor in the cleaning operation. The control unit 61a drives the stepping motor in the acceleration/deceleration drive mode from the time t6, which is the time when the nozzle 31 descends, to the time t10 at which the second height hC2 is reached. After the acceleration/deceleration drive mode actuates the stepping motor at time t6 and drives the nozzle 31 at the start pulse speed f1, an acceleration period is provided to gradually increase the operation pulse speed to accelerate; and after the stepping motor reaches the operation pulse speed f2 at the time t7, the constant speed operation of the operation pulse speed f2 is performed, and a deceleration period is provided from the time t8 to gradually decrease the pulse speed, and the stepping motor reaches and is driven at the start pulse speed f1 at the time t10.

The time t9 at which the tip 31a of the nozzle 31 contacts the liquid surface of the sample is set during the deceleration time of the nozzle 31, that is, from the time t8 to the time t10. The speed at time t9 is referred to as a second speed V2. The second speed V2 is set to be faster than the first speed V1 at the time of sample dispensing operation and reagent dispensing operation.

Although the same value may be set for each start pulse speed f1 and each operation pulse speed f2 in each operation of the sample dispensing operation, reagent dispensing operation, initial liquid surface height detecting operation, and cleaning operation, different values also may be set. The start pulse speed f1 and each operation pulse speed f2 of the sample dispensing operation also may be different for each sample, and each start pulse speed f1 and each operation pulse speed f2 in each operation of the reagent dispensing operation and the initial liquid surface height detecting operation may be different for each reagent. Although the starting pulse speed f1 at time t0 and the starting pulse speed f1 at time t3 may be set to the same value in the acceleration/deceleration drive mode of each operation of the sample dispensing operation, reagent dispensing operation, and initial liquid surface height detecting operation, different values also may be set. Although the activation pulse speed f1 at time t6 and the activation pulse speed f1 at time t10 may be set to the same value in the cleaning operation, different values also may be set.

The first liquid preferably is a liquid in which the influence of an error of the suction amount on the measurement result of the measurement unit 51 is greater than that of the second liquid to be described later, or a liquid that requires more reliable detection of the liquid surface than the second liquid; for example, any one of a sample, a reagent, and a secondary dispensing liquid. The second liquid can be, for example, either a cleaning liquid or a primary dispensing liquid. Note that the term "primary dispensing liquid" refers to the primary liquid to be dispensed when a liquid of a primary dispensing operation is performed in which a large amount of sample is suctioned from a sample container and discharged to another container, then a secondary dispensing operation is performed to suction a specified amount of sample from another container and the suctioned sample is discharged into a separate container in a secondary dispensing operation, wherein the "secondary dispensing liquid" refers to a liquid to be dispensed in a similar manner in the secondary dispensing operation.

After lowering the nozzle 31 in the acceleration/deceleration drive mode, the nozzle 31 is lowered in the constant speed drive mode and is suctioned during the constant speed drive mode. Since the first speed V1 when the nozzle 31 contacts the first liquid surface is slower than the second speed V2 when contacting the second liquid surface and the descending speed is constant, the fluctuation of the liquid surface is small when the tip end 31a of the nozzle 31 contacts the liquid surface of the first liquid, and the tip 31a of the nozzle 31 is unlikely to oscillate due to the contact impact. Therefore, it is possible to more accurately detect the liquid surface of the first liquid compared to the second liquid. In addition, the nozzle 31 is prevented from an overrun that can occur when the nozzle cannot stop accurately at a depth corresponding to the dispensing amount of the first liquid, and an accurate dispensing amount can be suctioned in comparison with the suction of the second liquid. Therefore, it is possible to accurately measure the measurement sample.

Since the influence on the measurement of the measurement sample is small even if the second liquid is not suctioned in an accurate amount by the nozzle 31 compared to the first liquid, the second speed V2 when the nozzle 31 contacts the second liquid surface can be made faster than the first speed V1 when the nozzle 31 contacts the first liquid surface. Therefore, it is possible to lower the nozzle 31 in the acceleration/deceleration drive mode without switching between the acceleration/deceleration drive mode and the constant speed drive mode, which leads to faster measurement of the measurement sample.

As described above, the nozzle 31 is lowered at different speeds with respect to the first liquid having a high influence on the measurement accuracy of the liquid surface detection and the second liquid having a lesser influence on the measurement with the accuracy of the liquid surface detection than the first liquid; and accurate measurement can be realized when the nozzle 31 is lowered at a second speed that is faster than the first speed with respect to the second liquid.

Specific Configuration of Sample Measuring Apparatus 100

Hereinafter, a specific configuration of the sample measuring apparatus 100 will be described with reference to FIGS. 7 to 11. In this embodiment, the sample measuring apparatus 100 is a blood coagulation measuring apparatus. The sample is plasma separated by centrifuging the whole blood contained in the sample container. Note that the sample measuring apparatus 100 may be an immunoassay device or a biochemical analysis device, in which case the sample may be any one of whole blood, plasma, serum.

The sample measuring apparatus 100 includes a measurement unit 61, a transport unit 63, and an analysis unit 64. The measurement unit 61 is communicably connected to the transport unit 63 and the analysis unit 64.

Transport Unit 63

Figure 7:
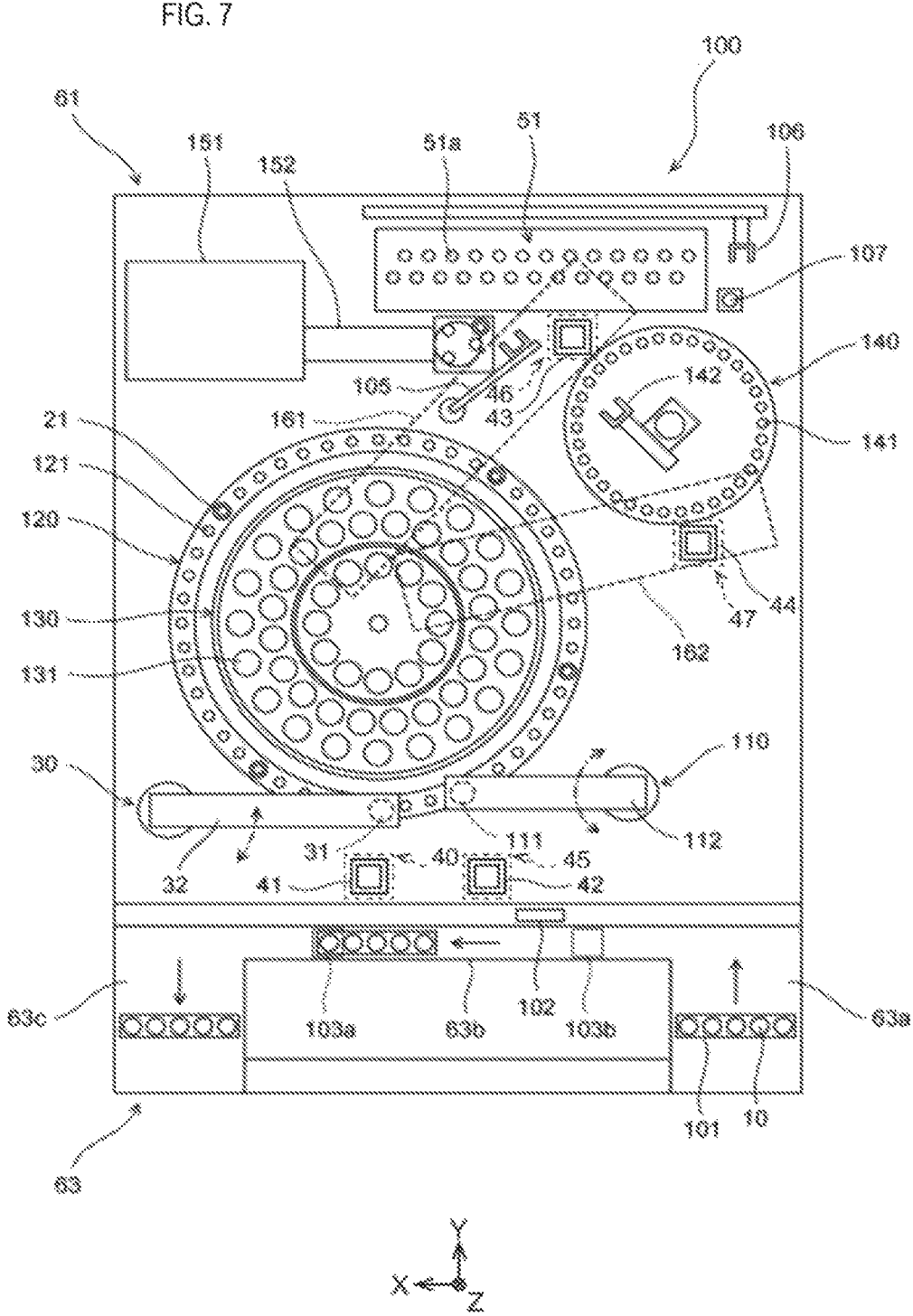
FIG. 7 is a diagram showing a configuration of a sample measuring apparatus according to one embodiment.

The transport unit 63 is a mechanism for transporting the sample container 10 to the measurement unit 61, and includes a rack setting unit 63*a*, a rack transporting unit 63*b*, and a rack collecting unit 63*c*, as shown in FIG. 7. The rack setting unit 63*a* and the rack collecting unit 63*c* are respectively connected to the right end and the left end of the rack transporting unit 63*b*. A barcode reader 102 is disposed behind the rack transport unit 63*b*. The operator installs the sample rack 101 in which the sample container 10 is placed in the rack setting unit 63*a*.

The transport unit 63 sends the sample rack 101 installed in the rack setting unit 63*a* to the right end of the rack transport unit 63*b* and also forwards the rack 101 to the front of the bar code reader 102. The barcode reader 102 reads a barcode from a barcode label affixed to the sample container 10 and acquires the sample ID. The sample ID is information that can identify samples individually. The obtained sample ID is transmitted to the analysis unit 64 in order to acquire the measurement order for the sample.

Subsequently, the transport unit 63 transports the sample rack 101 holding the sample container 10, and sequentially positions the sample container 10 at the sample suction position 103*a* or the sample suction position 103*b*. The sample suction position 103*a* is a position at which the sample dispensing mechanism 30 suctions the sample, and the sample suction position 103*b* is a position at which the sample dispensing mechanism 110 suctions the sample.

When the suction of a sample to all the sample containers 10 held in the sample rack 101 is completed, the transport unit 63 transports the sample rack 101 to the rack collection unit 63*c*.

Measurement Unit 61

The measurement unit 61 includes sample dispensing mechanisms 30 and 110, cleaning mechanisms 40, 45, 46, 47 which have cleaning tanks 41, 42, 43, 44, a reaction container table 120, a reagent table 130, a heating table 140, a reaction container storage unit 151, a reaction container supply unit 152, transfer units 105 and 106, reagent dispensing mechanisms 161 and 162, a measurement unit 51, a disposal port 107, a control unit 61*a*, a storage unit 61*b*, and a notifying unit 61*c*.

Figure 8:
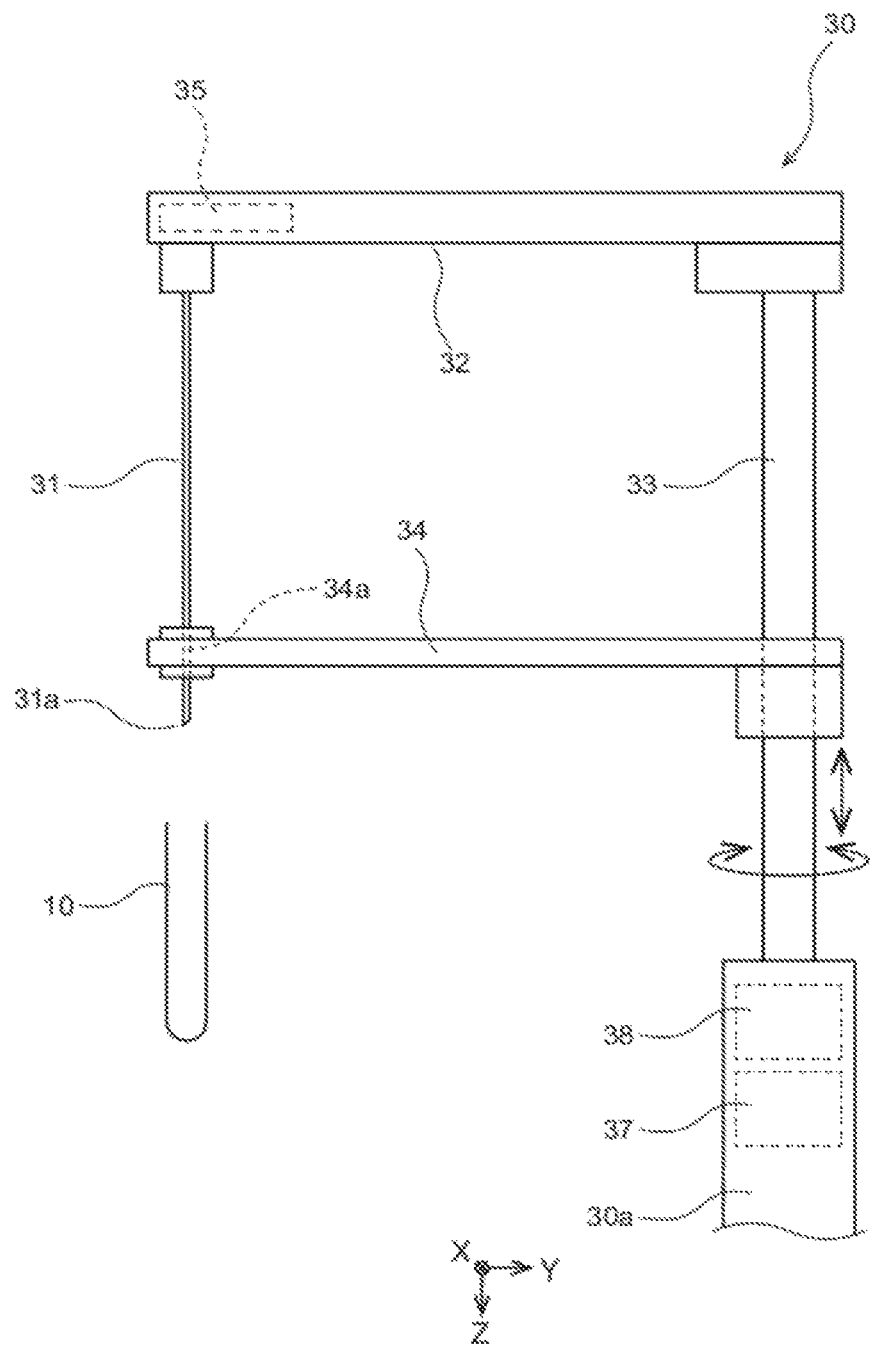
FIG. 8 is an explanatory diagram of a configuration of a sample dispensing mechanism.

A detailed structure of the sample dispensing mechanism 30 will be described below with reference to FIG. 8. The sample dispensing mechanism 30 includes a main body part 30*a*, a nozzle 31, an arm 32, a shaft part 33, a guide member 34, and a sensor 35. FIG. 8 shows a sample container 10 in addition to the sample dispensing mechanism 30.

The main body part 30*a* includes a drive unit 37 for moving the shaft part 33 in the Z-axis direction, and a drive unit 38 for rotating the shaft part 33 about the Z-axis direction as a rotational center. The drive units 37 and 38 are provided with a stepping motor. The shaft part 33 supports the arm 32. The nozzle 31 is installed downward at the end of the arm 32. The guide member 34 is rotatable in accordance with the rotation of the shaft part 33 and is installed on the shaft part 33 so that the position in the Z axis direction does not change. A hole 34*a* penetrating in the vertical direction is formed at the tip of the guide member 34, and the nozzle 31 passes through the hole 34*a*. The movement direction of the nozzle 31 is restricted in the Z-axis direction by the hole 34*a*. The operation of the nozzle 31 is controlled by a pulse signal output to the stepping motor of the drive units 37 and 38 by the control unit 61*a*, and the height position and the turning position of the nozzle 31 are obtained by counting the number of pulses of the pulse signal. Note that the drive units 37 and 38 also may include a rotary encoder and count the number of pulses output from the rotary encoder to detect the rotation direction and rotation amount of the stepping motor to obtain the height position and turn position of the nozzle 31. The drive units 37 and 38 also may include, for example, a DC servomotor in place of the stepping motor, and may be any motor insofar as the nozzle 31 can move in the Z-axis direction and can rotate. The sensor 35 configures a liquid surface detection unit, and detects that the tip 31*a* of the nozzle 31 has come into contact with the liquid surface. In this embodiment, the sensor 35 is a capacitance type sensor, but the sensor 35 is not limited thereto, and may be a pressure sensor that detects a change in a pressure value applied to the nozzle 31, for example. The sensor 35 also may be an ultrasonic sensor that detects the height of the liquid surface of the sample. Note that a mechanism such as a pump or a metering cylinder for suctioning or discharging a sample or a cleaning liquid is connected to the nozzle 31, and these mechanisms, the nozzle 31, and the drive units 37 and 38 configure a suction unit.

Note that the sample dispensing mechanism 110 is different from the sample dispensing mechanism 30 shown in FIG. 8 in that it does not include the guide member 34 and the drive unit 38, in other respects the configuration is the same as that of the sample dispensing mechanism 30, and their descriptions are omitted. The reagent dispensing mechanisms 161 and 162 each include a main body part 30*a*, a nozzle 31, an arm 32, a shaft part 33, a guide member 34, a sensor 35, a drive unit 37 for moving the shaft part 33 in the Z-axis direction. These structures are similar to those of the sample dispensing mechanism 30 shown in FIG. 8. Although not shown, a moving mechanism is provided for moving the nozzle 31 along the arm 32.

Figure 9A:
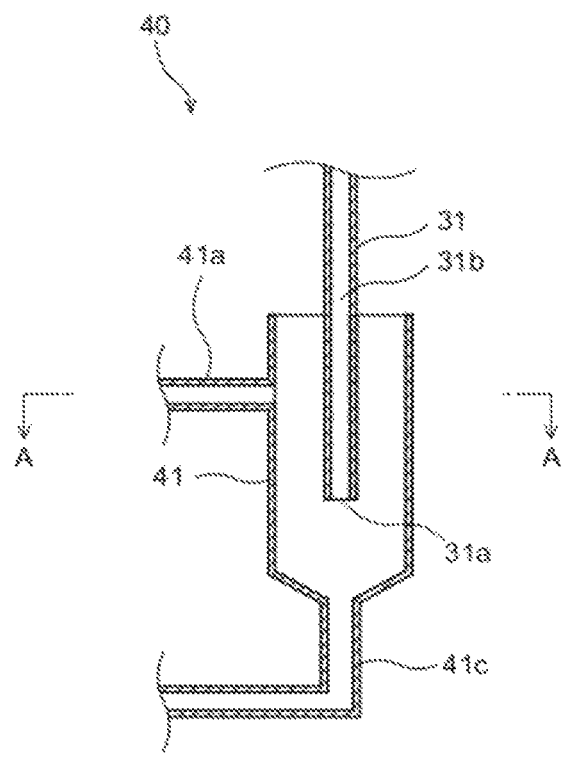
FIGS. 9A and 9B are explanatory diagrams of a configuration of a cleaning tank.
Figure 9B:
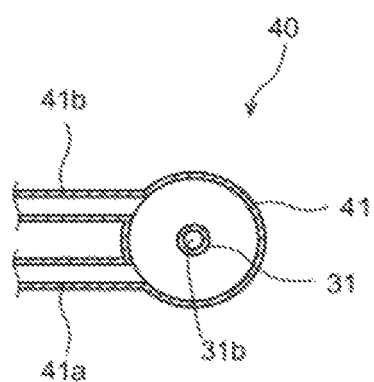

The structure of the cleaning mechanism 40 will be described with reference to FIGS. 9A and 9B. The cleaning mechanism 40 is a mechanism for cleaning the nozzle 31 of the sample dispensing mechanism 30, and includes a cleaning tank 41 with an opening at the top, a cleaning water injection pipe 41b provided at the top of the cleaning tank 41, a cleaning liquid overflow pipe 41a provided at the same height position as that of the pipe 416, and a cleaning liquid injection/discharge pipe 41c provided at the bottom of the cleaning tank 41. The cleaning tank 41 configures a second liquid storage unit, and the cleaning liquid injection/discharge pipe 41c configures a second liquid supply unit and a second liquid discharge unit. Although not shown, the cleaning mechanism 40 includes a cleaning water chamber in which cleaning water is stored, a cleaning solution chamber in which cleaning liquid is stored; the cleaning water chamber is connected to a cleaning water injection pipe 41b via a pump or the like, and the cleaning liquid chamber is connected to the cleaning liquid injection/discharge pipe 41c via a pump or the like.

The cleaning mechanism 40 supplies cleaning water for cleaning the outer peripheral surface of the nozzle 31 through the cleaning water injection pipe 41b at high pressure toward the nozzle 31 in the cleaning tank 41. The cleaning mechanism 40 supplies the cleaning liquid to the cleaning tank 41 through the cleaning liquid injection/discharge pipe 41c, and stores the cleaning liquid in the cleaning tank 41. The overflow pipe 41a causes excess cleaning liquid supplied to the cleaning tank 41 to flow out by the cleaning liquid injection and discharge pipe 41c so that the cleaning liquid is stored at a fixed amount and is not stored in the cleaning tank 41 at a height equal to or higher than the height of the overflow pipe 41a. The cleaning liquid stored in the cleaning tank 41 and the cleaning water discharged to the cleaning tank 41 are discharged to the outside through the cleaning liquid injection/discharge pipe 41c.

The nozzle 31 suctions and discharges the cleaning liquid stored in the cleaning tank 41 by the cleaning liquid injection/discharge pipe 41c, thereby cleaning the flow path 31b in the nozzle 31. A cleaning water chamber (not shown) in which cleaning water is stored via a pump or the like also is connected to the flow path 31b of the nozzle 31, and at the time of cleaning, a cleaning liquid flows through the nozzle 31 via the flow path 31b of the nozzle 31 and is discharged to the cleaning tank 41.

Note that although the cleaning liquid is supplied to the cleaning tank 41 by the cleaning liquid injection/discharge pipe 41c and the cleaning liquid and the cleaning water collected in the cleaning tank 41 are discharged in this embodiment, the present invention is not limited to this embodiment. For example, a cleaning liquid injection pipe for supplying a cleaning liquid, and a cleaning liquid discharge pipe for discharging a cleaning liquid accumulating in the cleaning tank 41 also may be separately provided in the cleaning tank 41.

Note that the cleaning mechanism 45 includes a cleaning tank 42 for cleaning each nozzle 31 of the sample dispensing mechanism 110, the cleaning mechanisms 46 and 47 are provided with cleaning tanks 43 and 44 and perform a reagent dispensing operation to clean each of the nozzles 31 of the reagent dispensing mechanisms 161 and 162 after the reagent dispensing operation is completed. Since the structure of the cleaning mechanisms 45, 46, and 47 is the same as that of the cleaning mechanism 40, further explanation is omitted.

The reaction container 21 is a container having an opening at the top, and is a so-called cuvette. The reaction container 21 is a disposable container for carrying out measurement in the measurement unit 51 of the measurement unit 61.

The reaction container table 120 has an annular shape in plan view and is disposed outside the reagent table 130. The reaction container table 120 is configured to be rotatable in the circumferential direction. The reaction container table 120 has a plurality of holding holes 121 for holding the reaction container 21.

The reaction container housing 151 houses a new reaction vessel 21. The reaction container supply unit 152 removes the reaction containers 21 one by one from the reaction container storage unit 151 and supplies the removed reaction container 21 to the holding position by the transfer unit 105. The transfer unit 105 grips the reaction container 21 supplied to the holding position by the reaction container supply unit 152 and sets held reaction container 21 in the holding hole 121 of the reaction container table 120.

The heating table 140 includes a plurality of holding holes 141 for holding the reaction containers 21, and a transfer unit 142 for transferring the reaction containers 21. The heating table 140 has a circular contour in plan view and is configured to be rotatable in the circumferential direction. The heating table 140 heats the reaction container 21 set in the holding hole 141 to 37° C.

When the sample is discharged to the new reaction container 21 held in the reaction container table 120, the reaction container table 120 is rotated, and the reaction container 21 containing the sample is transferred to the vicinity of the heating table 140. Then, the transfer unit 142 of the heating table 140 grips the reaction container 21 and sets it in a holding hole 141 of the heating table 140.

The reagent table 130 is configured so that a plurality of reagent containers 131 can be installed, each reagent container 131 containing a preparation reagent and a trigger reagent used for measurements relating to a blood coagulation test. The reagent table 130 is configured to be rotatable in the circumferential direction. The reagent is dispensed to the reaction container 21 heated by the heating table 140 by the reagent dispensing mechanisms 161 and 162.

When dispensing the preparation reagent to the reaction container 21, the transfer unit 142 of the heating table 140 removes the reaction container 21 from the holding hole 141 of the heating table 140 and positions the removed reaction container 21 at a predetermined position. Then, the reagent dispensing mechanism 161 or the reagent dispensing mechanism 162 suctions the prepared reagent from the reagent container 131 and discharges the suctioned prepared reagent to the reaction container 21. In this way the preparation reagent is mixed with the sample. Thereafter, the transfer unit 142 again sets the reaction container 21 in the holding hole 141 of the heating table 140.

When the trigger reagent is dispensed to the reaction container 21, the transfer unit 106 removes the reaction container 21 from the holding hole 141 of the heating table 140 and positions the removed reaction container 21 at a predetermined position. Then, the reagent dispensing mechanism 161 or the reagent dispensing mechanism 162 suctions the trigger reagent from the reagent container 131 and dispenses the suctioned trigger reagent to the reaction container 21. In this way the trigger reagent is mixed with the sample, and a measurement sample is prepared. Thereafter, the transfer unit 106 sets the reaction container 21 in the holding hole 51a of the measuring unit 51.

Figure 10A:
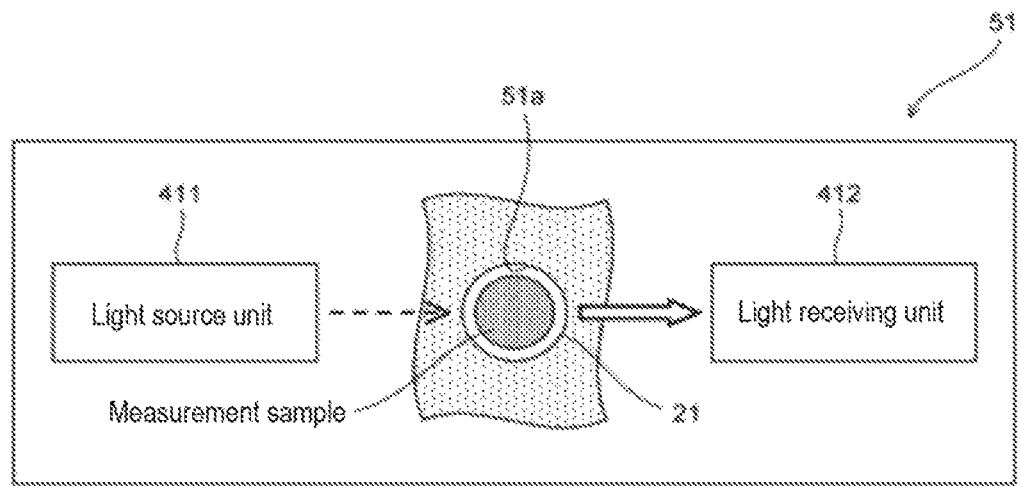
FIGS. 10A and 10B are explanatory diagrams of a measurement unit.

The measurement unit 51 measures the measurement sample prepared with the first liquid such as a reagent or a sample, and performs, for example, measurement relating to a blood coagulation test. In the present embodiment, blood as a sample is coagulated in the presence of a fibrinolytic activator, and a coagulation waveform is acquired by an optical measurement method. As shown in FIG. 10A, the measurement unit 51 includes a plurality of holding holes 51a, a light source unit 411, and a light receiving unit 412. In FIG. 10A, the periphery of one holding hole 51a is shown. The light source unit 411 includes a semiconductor laser light source and emits light having different wavelengths. The light source unit 411 irradiates light on the reaction container 21 set in each holding hole 51a. When the measurement sample in the reaction container 21 is irradiated with light, the light transmitted through the measurement sample or the light scattered by the measurement sample is incident on the light receiving unit 412. The light receiving unit 412 is provided for each holding hole 51a, and is configured by a photodetector. Specifically, the light receiving unit 412 is formed of a photoelectric tube, a photodiode, or the like. The light receiving unit 412 receives the transmitted light or the scattered light and outputs an electric signal corresponding to the received light amount. Based on the electric signal output from the light receiving unit 412, the control unit 61a generates measurement data used for analysis relating to the blood coagulation test. The measuring principle of the measuring unit 51 is, for example, a coagulation method, a synthetic substrate method, an immunoturbidimetric method, an agglutination method, or the like. Note that the coagulation waveform may be acquired by a physical measurement method. As a physical measurement method, for example, a method of acquiring physical information such as the viscosity of a sample by using a steel ball can be mentioned. In this method, the steel ball is amplitude-moved left and right by an electromagnet in the blood, and the change in the amplitude is detected by a coil. As clotting of blood begins, the viscosity increases and the amplitude of the steel ball decreases, so it is possible to determine the viscosity and coagulation time of the blood.

Figure 10B:
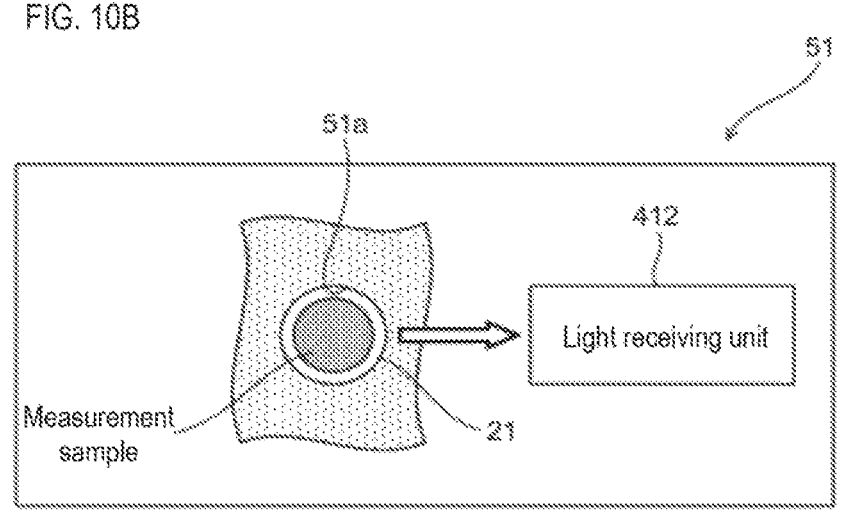
Figure 11:
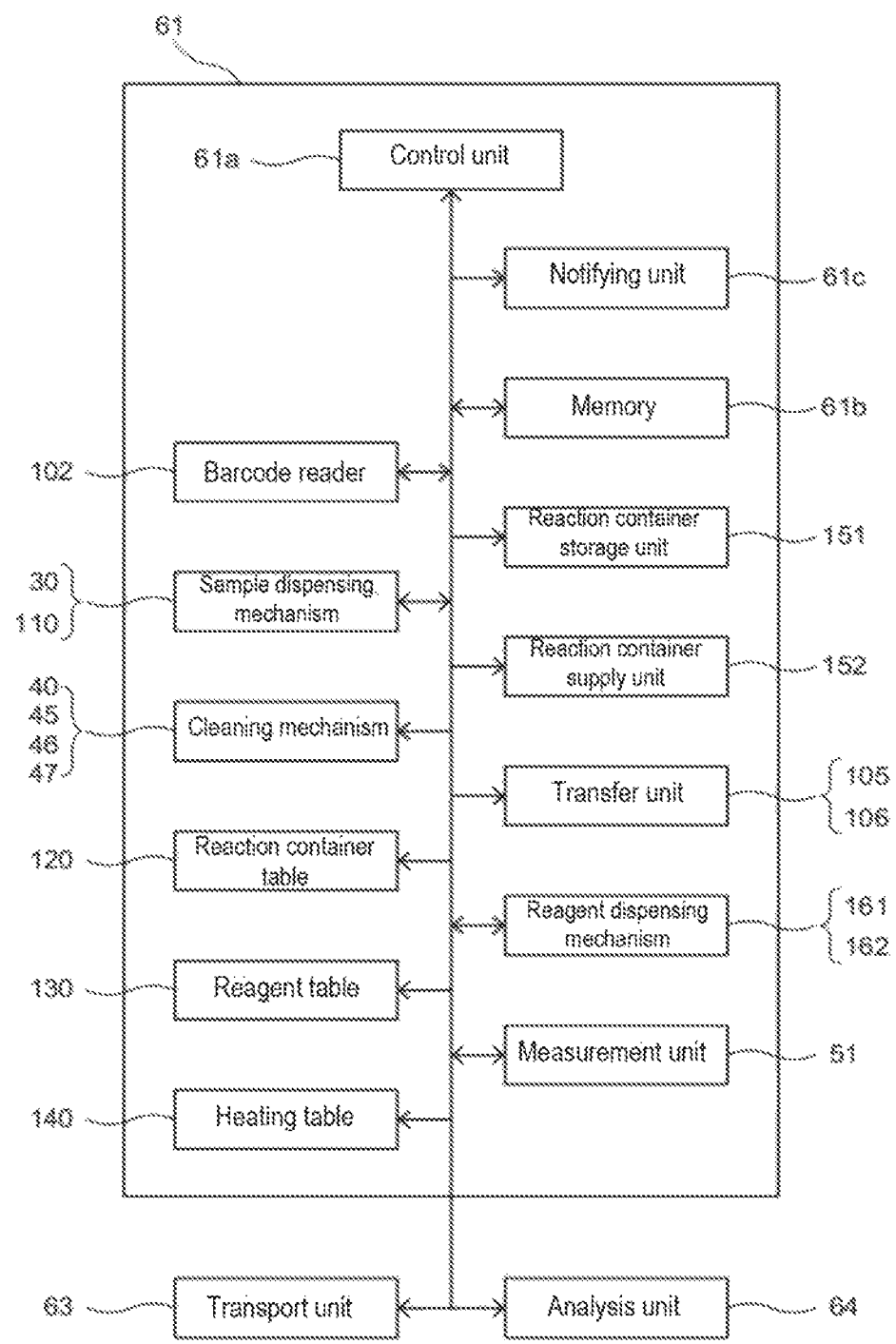
FIG. 11 is a diagram showing a circuit configuration of a sample measuring apparatus.

The measurement unit 51 also may perform measurement relating to immunological tests. In this case, as shown in FIG. 10B, the measuring unit 51 includes a light receiving unit 421 in addition to the holding hole 51a. The periphery of one holding hole 51a is shown FIG. 10B. The chemiluminescence generated from the measurement sample contained in the reaction container 21 is incident on the light receiving unit 412. The light receiving unit 412 is configured by a photon detector capable of photon counting. Specifically, the light receiving unit 412 is configured by a photomultiplier tube. When the light receiving unit 412 is configured by a photomultiplier tube capable of photon counting, the measurement unit 51 can measure with high sensitivity and high accuracy. The light receiving unit 412 receives chemiluminescence and outputs a pulse waveform corresponding to photons, that is, photons received. The measurement unit 51 counts photons at regular intervals based on the output signal of the light receiving unit 412 by an internal circuit and outputs a count value. The control unit 61a generates measurement data to be used in the analysis related to the immunity test based on the count value output from the measurement unit 51.

Here, chemiluminescence is light emitted by utilizing energy from a chemical reaction, for example, light emitted when a molecule is excited by a chemical reaction to an excited state and returns therefrom to the ground state. In the embodiment, the chemiluminescence measured by the measurement unit 51 is light based on the enzyme immunochemical luminescence method (CLEIA), and is light generated by the reaction between an enzyme and a substrate. The chemiluminescence measured by the second measurement unit 52 is, for example, chemiluminescence analysis (CLIA), electrochemiluminescence analysis (ECLIA), fluorescence enzyme measurement (FEIA), LOCI (Luminescent Oxygen Channeling Immunoassay), BLEIA method (bioluminescent enzyme immunization method), or the like.

The measurement unit 51 also may perform measurements related to biochemical tests. The measurement unit 51 in this case has the same configuration as when performing measurement relating to the blood coagulation test shown in FIG. 10A. The control unit 61a generates measurement data used in analysis relating to biochemical examination based on the electric signal output from the light receiving unit 412.

When the measurement of the measurement sample in the reaction container 21 is completed, the reaction container 21 is discarded to the disposal port 107 by the transfer unit 106.

As shown in FIG. 1, the measurement unit 61 includes a control unit 61a, a storage unit 61b, a notifying unit 61c, a barcode reader 102, sample dispensing mechanisms 30 and 110, cleaning mechanisms 40, 45, 46, and 47, a reaction container table 120, a reagent table 130, a heating table 140, a reaction container storage unit 151, a reaction container supply unit 152, transfer units 105 and 106, reagent dispensing mechanisms 161 and 162, and a measurement unit 51. The sample dispensing mechanisms 30 and 110, and the reagent dispensing mechanisms 161 and 162 respectively include a sensor 35 shown in FIG. 8 and the drive units 37 and 38. Cleaning mechanisms 40, 45, 46, and 47 include cleaning tanks 41, 42, 43, and 44, respectively.

Figure 12:
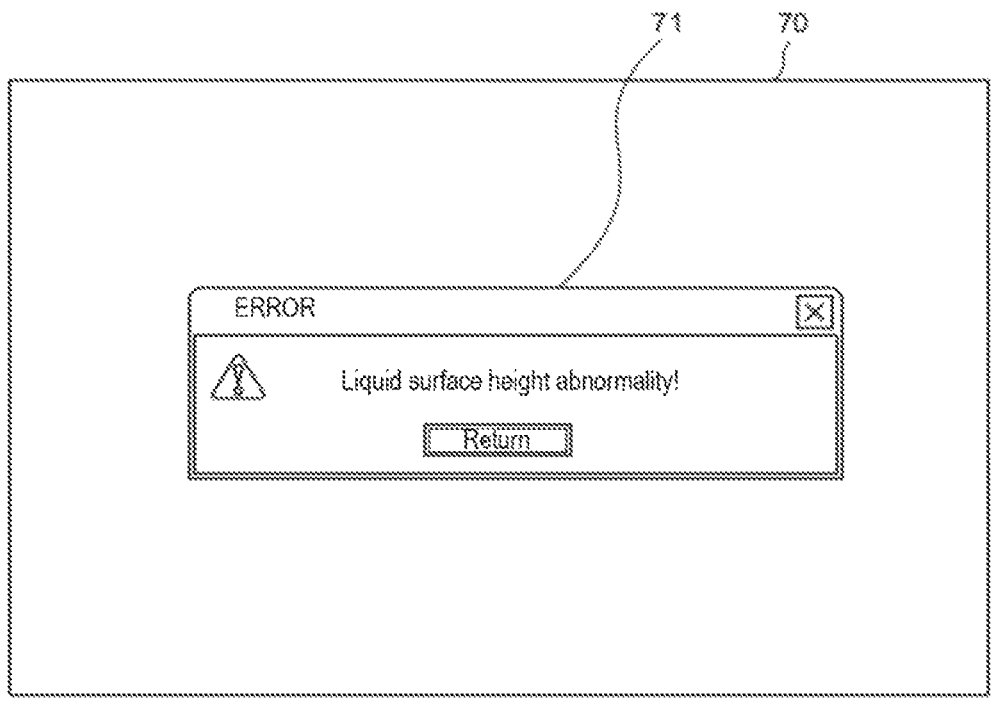
FIG. 12 is an example of a screen for notifying of abnormality of the liquid surface height.

The control unit 61a is configured by, for example, a CPU or a microcomputer, and controls each structure in the measurement unit 61 and the transport unit 63 according to a program stored in the storage unit 61b. The storage unit 61b is configured by a ROM, a RAM, a hard disk, and the like. The notifying unit 61c is configured by, for example, a monitor and a speaker. Upon detecting an abnormality in the liquid surface of the sample, the reagent, and the cleaning liquid, when the notifying unit 61c is a monitor, the control unit 61a, for example, displays a screen 71 as shown in FIG. 12 on the monitor 70 notifying that LC is abnormal. When the notifying unit 61c is a speaker, the notification issued by sound.

Analysis Unit 64

The analysis unit 64 is configured by, for example, a personal computer. The analysis unit 64 analyzes the blood coagulation test based on the measurement data generated by the measurement unit 61. In the present embodiment, information related to the linear solubility of the blood sample is acquired based on the coagulation waveform as the measurement data. Analysis items such as PT, APTT, Fbg, extrinsic coagulation factor, intrinsic coagulation factor, coagulation factor XIII, HpT, TTO, FDP, D dimer, PIC, FM, ATIII, Plg, APL, PC, VWF: Ag, and VWF: RCo are analyzed.

The analysis unit 64 also may analyze the immunity test based on the measurement data generated by the measurement unit 61. Specifically, the analysis unit 64 may analyze HBs antigen, HBs antibody, HBc antibody, HBe antigen, HBe antibody, HCV antibody, TP antibody, HTLV antibody, HIV antigen/antibody, TAT, PIC, TM, tPAI/c, TSH, FT3, FT4 and the like.

The analysis unit 64 also may perform analysis related to biochemical tests based on the measurement data generated by the measurement unit 61. Specifically, the analysis unit 64 may analyze analysis items such as T-BIL, D-BIL, AST, ALT, ALP, LDH, γ-GTP, T-CHO, CRE, CK and the like.

Operation of Sample Measuring Apparatus 100

Figure 13:
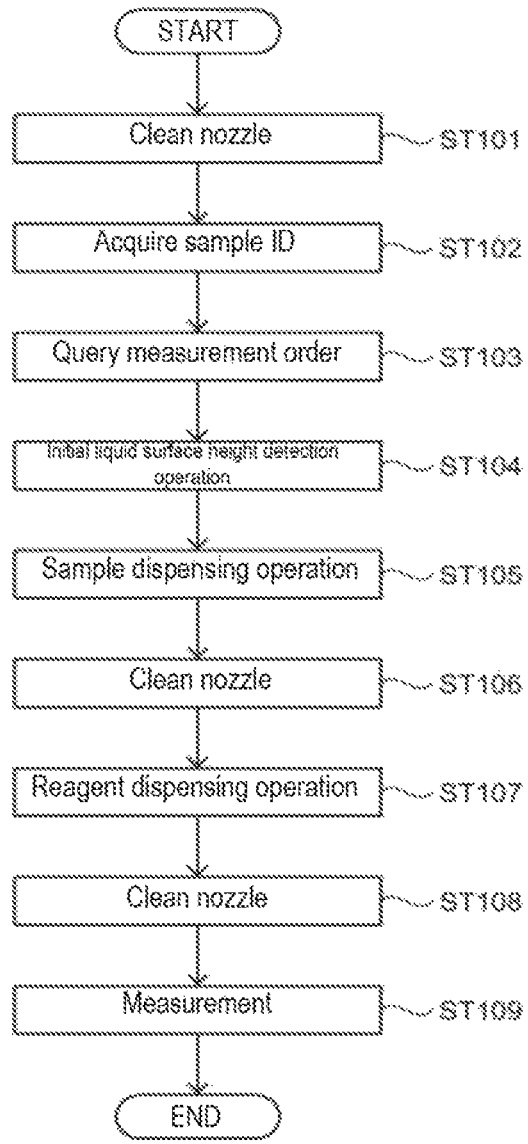
FIG. 13 is a flowchart showing the operation of the sample measuring apparatus.

The operation process of the sample measuring apparatus 100 will be described below with reference to the flowcharts shown in FIGS. 13 to 18. FIG. 13 is a flowchart showing the process of the sample measuring apparatus 100 for a certain sample container 10. When the sample measuring apparatus 100 is activated, in step ST101, the control unit 61*a* drives the sample dispensing mechanisms 30 and 110, the reagent dispensing mechanisms 161 and 162, and the cleaning mechanisms 40, 45, 46, and 47, and performs a cleaning operation process of cleaning each of the nozzles 31 of the sample dispensing mechanisms 30 and 110 and the reagent dispensing mechanisms 161 and 162.

In step ST102, the control unit 61*a* drives the transport unit 63 to transport the sample container 10 to the front of the barcode reader 102, drives the barcode reader 102, and the barcode reader 102 reads the sample ID from the barcode label of the sample container 10. In step ST103, the control unit 61*a* makes an inquiry about the measurement order to the analysis unit 64 based on the sample ID acquired in step ST102, and obtains the inquiry result such as the measurement conditions, the reagent to be used, the reagent, the dispensed amount of the sample and the like.

In step ST104, the control unit 61*a* performs the initial liquid surface height detection operation process of the reagent to be used. In step ST05, the control unit 61*a* performs a sample dispensing operation process. That is, the sample dispensing mechanism 30 is driven to suction the sample in the sample container 10, and the suctioned sample is discharged to a new reaction container 21 held in the reaction container table 120. In step ST106, the control unit 61*a* drives the sample dispensing mechanism 30 and the cleaning mechanism 40 to perform a cleaning operation process of cleaning the nozzle 31 of the sample dispensing mechanism 30. In step ST107, the control unit 61*a* performs a reagent dispensing operation process. That is, the reagent dispensing mechanism 161 is driven to suction the reagent in the reagent container 131, and the suctioned reagent is discharged to the reaction container 21. In step ST108, the control unit 61*a* drives the reagent dispensing mechanism 161 and the cleaning mechanism 43 to perform a cleaning operation process of cleaning the nozzle 31 of the reagent dispensing mechanism 161. In step ST109, the control unit 61*a* performs a measurement based on the sample by the measurement unit 51.

In this way when the process is completed for one sample container 10 positioned at the sample suction position 103*a*, the process returns to step ST102, and the control unit 61*a* performs the processes of steps ST102 to ST109 for a subsequent sample container 10. Initial liquid surface height detection operation processing of the reagent in step ST104 is only performed immediately after activation of the sample measuring apparatus 100 or immediately after the control unit 61*a* has detected the reagent container 131 has been exchanged or additional reagent has been injected into the reagent container 131.

Figure 14:
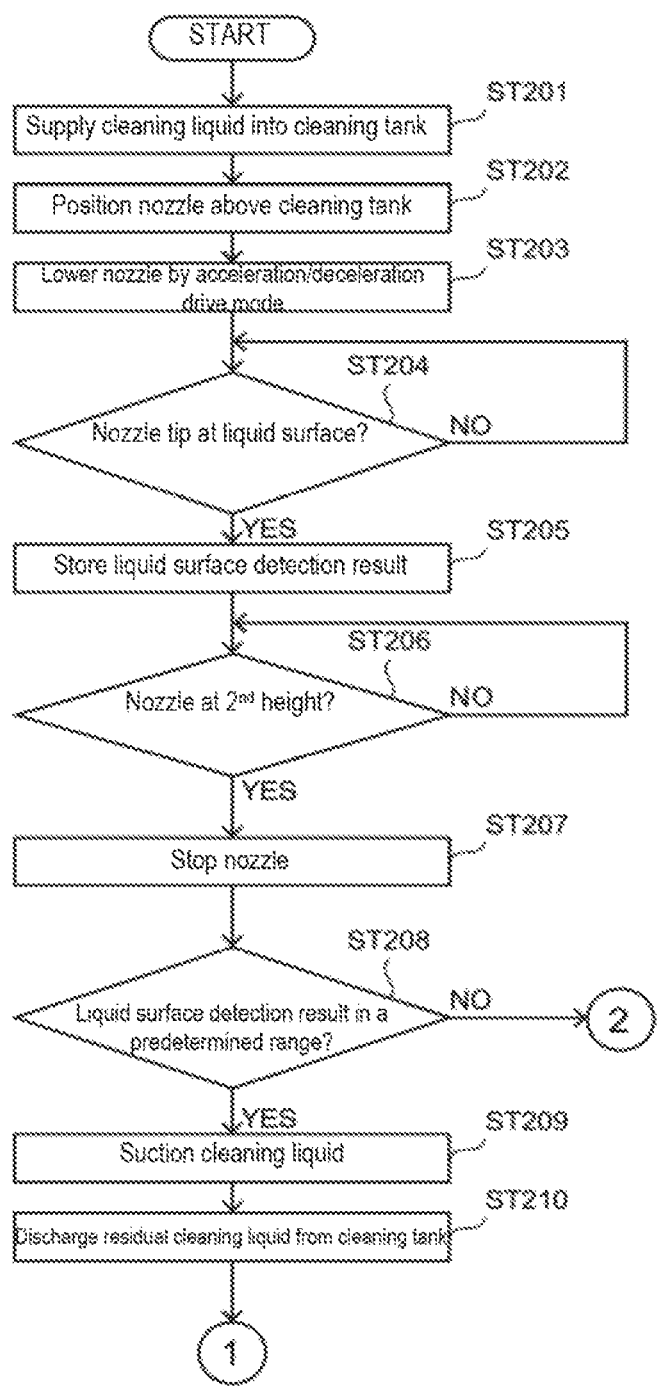
FIG. 14 is a flowchart showing a procedure of a cleaning operation process.
Figure 15:
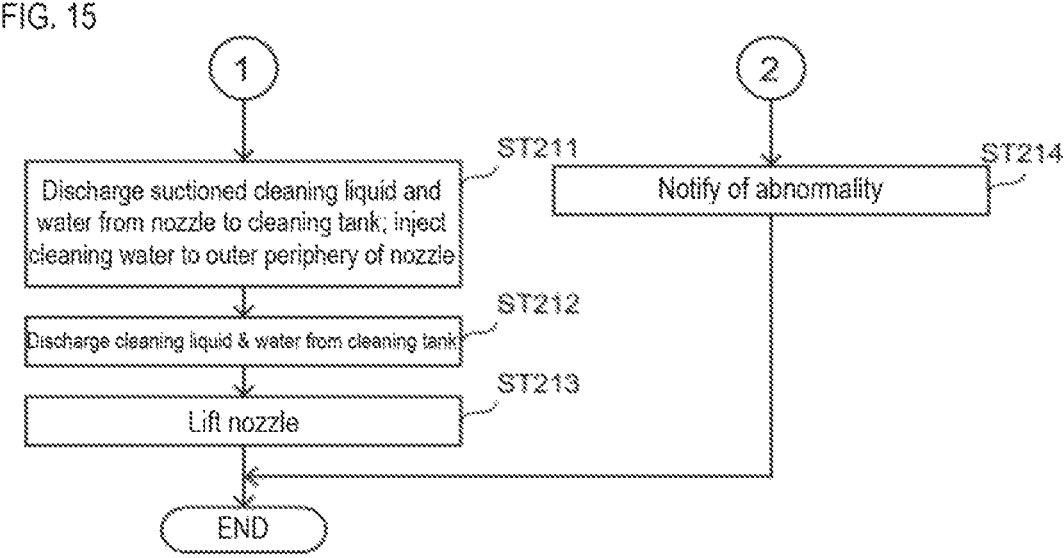
FIG. 15 is a flowchart showing a procedure of a cleaning operation process.

FIGS. 14 and 15 are flowcharts showing the procedure of the cleaning operation process in step ST101 of FIG. 13. Although the cleaning operation of the sample dispensing mechanism 30 will be described below, it is to be noted that the cleaning operations of the sample dispensing mechanism 110 and the reagent dispensing mechanisms 161 and 162 are performed in the same way as the sample dispensing mechanism 30.

First, in step ST201 of FIG. 14, the control unit 61*a* supplies the cleaning liquid to the cleaning tank 41 through the cleaning liquid injection and discharge pipe 41*c*, and stores the cleaning liquid in the cleaning tank 41. The control unit 61*a* supplies the cleaning liquid in an amount overflowing from the overflow pipe 41*a* to the cleaning tank 41 so as to position the liquid surface of the cleaning liquid directly under the overflow pipe 41*a*. In step ST202, the control unit 61*a* drives the drive unit 38 of the sample dispensing mechanism 30 to position the nozzle 31 just above the cleaning tank 41. In step ST203, the control unit 61*a* drives the drive unit 37 to lower the nozzle 31 of the sample dispensing mechanism 30 in the acceleration/deceleration drive mode. The nozzle 31 also descends while the following steps ST204 to ST206 are executed. In step ST204, the control unit 61*a* monitors the output signal from the sensor 35, and determines whether the tip 31*a* of the nozzle 31 has come into contact with the liquid surface. When the tip 31*a* of the nozzle 31 is not in contact with the liquid surface, the control unit 61*a* repeats the step ST204 until the tip 31*a* of the nozzle 31 comes into contact with the liquid surface. When the tip 31*a* of the nozzle 31 comes into contact with the liquid surface, the process proceeds to step ST205. In step ST205, the control unit 61*a* determines the number of pulses supplied to the stepping motor of the drive unit 37 when the tip 31*a* of the nozzle 31 contacts the liquid surface, that is, the number of pulses corresponding to the liquid surface height LC at that time, and stores the pulse value in the storage unit 61*b* as the liquid surface detection result.

In step ST206, the control unit 61*a* determines whether the tip 31*a* of the nozzle 31 has reached the second height hC2 stored in the storage unit 61*b*, based on the number of pulses supplied to the stepping motor of the drive unit 37. When the nozzle 31 has not reached the second height hC2, the control unit 61*a* repeats the step ST206 until the nozzle 31 reaches the second height hC2. When the tip 31*a* of the nozzle 31 reaches the second height hC2, the process proceeds to step ST207. In step ST207, the control unit 61*a* controls the drive unit 37 to stop the descent of the nozzle 31. In step ST208, the control unit 61*a* determines whether the number of pulses corresponding to the liquid surface height LC stored in step ST205 is within the range between the upper limit and the lower limit of the number of pulses indicating the normal range of the liquid surface height stored in the storage unit 61*b*. For example, if the number of pulses corresponding to the liquid surface height LC is 300, the control unit 61*a* determines that the liquid surface height LC is normal when the lower limit value of the pulse number indicating the normal range of the liquid surface height stored in the storage unit 61*b* is 280 and the upper limit value is 320, and proceeds to step ST209.

In step ST209, the control unit 61*a* controls the pump or the like connected to the nozzle 31, and causes the nozzle 31 to suction the cleaning liquid by a predetermined amount. Note that the cleaning liquid may be discharged after suction and suctioned again. The interior of the nozzle 31 is cleaned by repeating suction and discharge of the cleaning liquid. Next, in step ST210, the control unit 61*a* controls the pump and the like connected to the cleaning liquid injection/discharge pipe 41*c* to discharge the cleaning liquid remaining in the cleaning tank 41. In step ST211 of FIG. 15, the control unit 61*a* causes the cleaning liquid to be discharged from the nozzle 31, then discharges the cleaning water from the cleaning water chamber connected to the nozzle 31 to the flow path 31*b* of the nozzle 31 to the cleaning tank 41, and flows the residual cleaning liquid remaining in the flow path 31*b* in the nozzle 31. The control unit 61*a* also controls the pump or the like connected to the cleaning water injection pipe 41*b* to spray the cleaning water onto the outer peripheral surface of the nozzle 31 to clean the outer peripheral surface of the nozzle 31. In step ST212, the control unit 61*a* controls the pump and the like connected to the cleaning liquid injection and discharge pipe 41*c*, and discharges the cleaning liquid and cleaning water collected in the cleaning tank 41 by the operation of step ST211. In step ST213, the control unit 61*a* controls the drive unit 37 to raise the nozzle 31, and the process is terminated.

Returning to step ST208, when the number of pulses corresponding to the liquid surface height LC falls below the lower limit value of the normal range, for example, when the lower limit value of the number of pulses indicating the normal range of the liquid surface height stored in the storage unit 61*b* is 280 and the upper limit value is 320, if the number of pulses corresponding to the liquid surface height LC is 250, the control unit 61*a* determines that the liquid surface height LC is abnormal, a discharge abnormality of the cleaning liquid occurs, and the process proceeds to step ST214 in FIG. 15. In step ST214, the control unit 61*a* controls the notifying unit 61*c* to notify the supply abnormality and terminates the process. When the number of pulses reflecting the liquid surface height LC exceeds the upper limit value of the normal range in step ST208, for example, when the lower limit value of the number of pulses indicating the normal range of the liquid surface height stored in the storage unit 61*b* is 280 and the upper limit value is 320, if the number of pulses corresponding to the liquid surface height LC is 350, the control unit 61*a* determines that the liquid surface height LC is abnormal, a supply abnormality of the cleaning liquid occurs, and the process proceeds to step ST214. In step ST214, the control unit 61*a* controls the notification unit 61*c* to notify of the discharge abnormality, and ends the process. Note that the processing also may be terminated without notification of the supply abnormality and discharge abnormality in step ST214.

If it is determined in step ST208 that the liquid surface height LC is abnormal, the control unit 61*a* does not proceed to the next step in FIG. 13, and ends the process.

Figure 16:
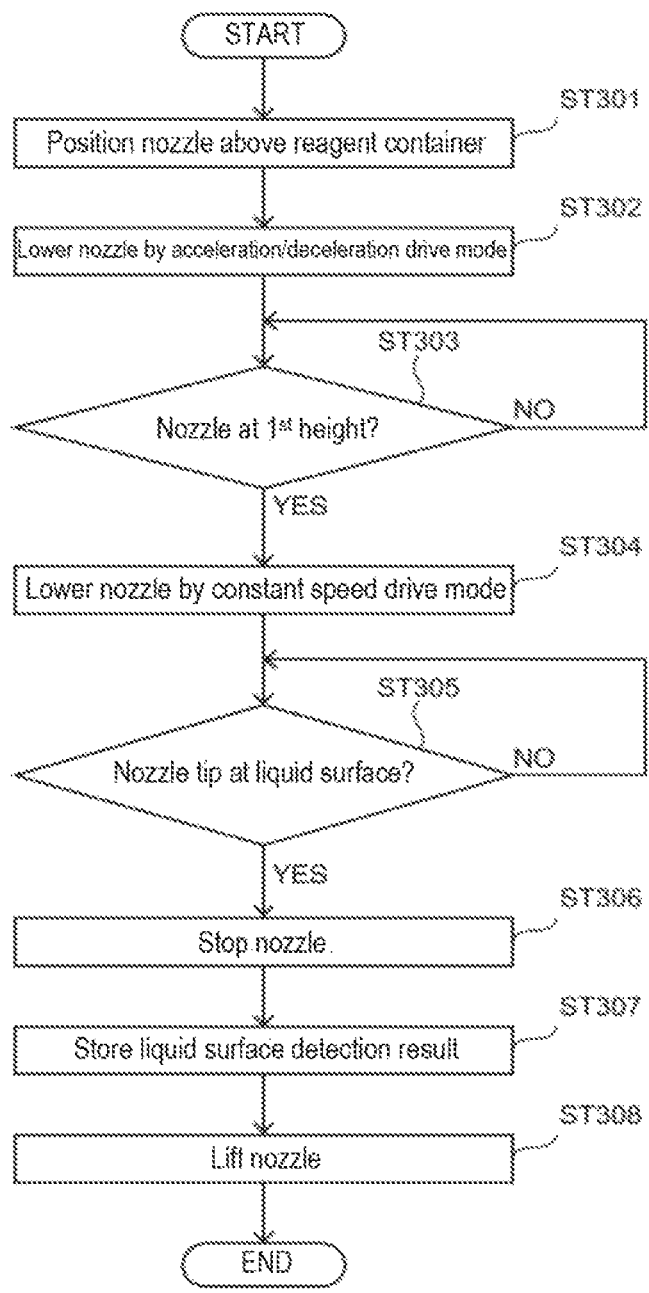
FIG. 16 is a flowchart showing a procedure of an initial liquid surface height detection operation process.

FIG. 16 is a flowchart showing the procedure of the initial liquid surface height detection operation process in step S104 of FIG. 13. In step ST301, the control unit 61*a* drives the drive unit 38 of the reagent dispensing mechanism 161 to position the nozzle 31 just above the reagent container 131. Next, in step ST302, the control unit 61*a* drives the drive unit 37 to lower the nozzle 31 of the reagent dispensing mechanism 161 in the acceleration/deceleration drive mode. In step ST303, the control unit 61*a* determines whether the nozzle 31 reaches the first height hR1-1 stored in the storage unit 61*b*, based on the number of pulses of counted pulse signal supplied to the stepping motor of the drive unit 37. When the nozzle 31 has not reached the first height hR1-1, the control unit 61*a* repeats the step ST303 until the nozzle 31 reaches the first height hR1-1. Note that while the step ST303 is executed, the nozzle 31 is descending in the acceleration/deceleration drive mode.

When the nozzle 31 reaches the first height hR1-1, the process proceeds to step ST304. In step ST304, the control unit 61*a* controls the drive unit 37 to lower the nozzle 31 in the constant-speed drive mode. In step ST305, the control unit 61*a* monitors the output signal from the sensor 35, and determines whether the tip 31*a* of the nozzle 31 has come into contact with the liquid surface. When the tip 31*a* of the nozzle 31 is not in contact with the liquid surface, the control unit 61*a* repeats the step ST305 until the tip 31*a* of the nozzle 31 comes into contact with the liquid surface. Note that while the step ST30 is being executed, the nozzle 31 is descending in the constant speed drive mode. When the tip 31*a* of the nozzle 31 comes into contact with the liquid surface, in step ST306 the control unit 61*a* controls the drive unit 37 to stop the descent of the nozzle 31. In step ST 307, the control unit 61*a* determines the number of pulses supplied to the stepping motor of the drive unit 37 when the tip 31*a* of the nozzle 31 contacts the liquid surface, that is, the number of pulses corresponding to the liquid surface height LR at that time, and stores the pulse count value in the storage unit 61*b* as the liquid surface detection result. Thereafter, in step ST308, the control unit 61*a* controls the drive unit 37 to raise the nozzle 31, and the process is terminated.

Figure 17:
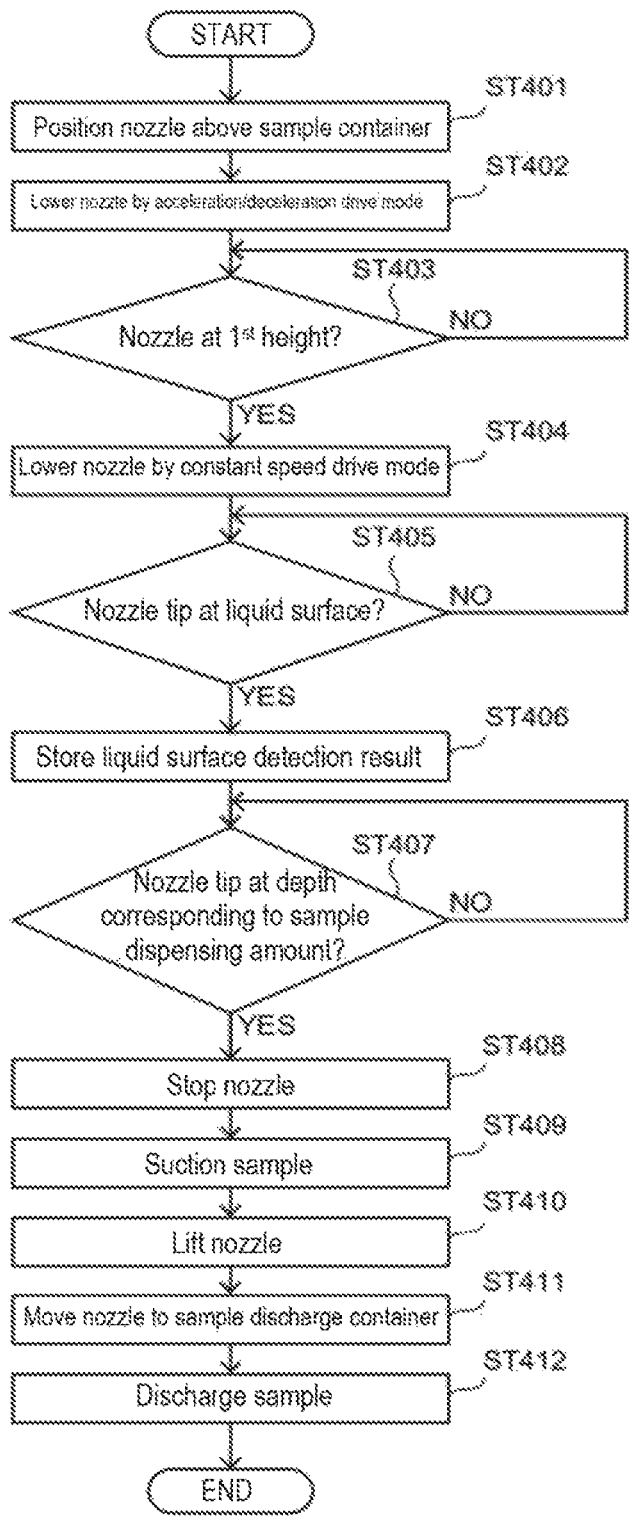
FIG. 17 is a flowchart showing a procedure of a sample dispensing operation process.

FIG. 17 is a flowchart showing the procedure of the sample dispensing operation process shown in step ST105 in FIG. 13. In step ST401 of FIG. 17, the control unit 61*a* drives the drive unit 38 of the sample dispensing mechanism 30 to position the nozzle 31 just above the sample container 10. Next, in step ST402, the control unit 61*a* drives the drive unit 37 to lower the nozzle 31 of the sample dispensing mechanism 30 in the acceleration/deceleration drive mode. In step ST403, the control unit 61*a* determines whether the tip 31*a* of the nozzle 31 has reached the first height hS1 stored in the storage unit 61*b*, from the number of pulses of counted pulse signals supplied to the stepping motor of the drive unit 37. When the nozzle 31 has not reached the first height hS1, the control unit 61*a* repeats the step ST403 until the nozzle 31 reaches the first height hS1. Note that while the step ST403 is executed, the nozzle 31 is descending in the acceleration/deceleration drive mode.

When the nozzle 31 reaches the first height hS1, the process proceeds to step ST404, and the control unit 61*a* controls the drive unit 37 to lower the nozzle 31 in the constant speed drive mode. In step ST405, the control unit 61*a* monitors the output signal from the sensor 35 and determines whether the tip 31*a* of the nozzle 31 has come into contact with the liquid surface. When the tip 31*a* of the nozzle 31 is not in contact with the liquid surface, the control unit 61*a* repeats the step ST405 until the tip 31*a* of the nozzle 31 comes into contact with the liquid surface. When the tip 31*a* of the nozzle 31 comes into contact with the liquid surface, the process proceeds to step ST406. In step ST406, the control unit 61*a* determines the number of pulses supplied to the stepping motor of the drive unit 37 when the tip 31*a* of the nozzle 31 contacts the liquid surface, that is, the number of pulses corresponding to the liquid surface height LS at that time, and stores the pulse count value in the storage unit 61*b* as the liquid surface detection result.

In step ST407, the control unit 61*a* determines from the number of pulses supplied to the stepping motor whether the tip 31*a* of the nozzle 31 has reached the position of the depth hS0 corresponding to the dispensing amount of the sample further downward from the liquid surface height LS. When the tip 31*a* of the nozzle 31 has not yet reached the lower position from the liquid surface height LS to the depth hS0 corresponding to the dispensing amount of the sample, the control unit 61*a* repeats the step ST407 until the tip 31*a* of the nozzle 31 reaches the depth hS0 corresponding to the dispensing amount of the sample. Note that while the steps ST405 to ST407 are executed, the nozzle 31 is descending in the constant speed drive mode. When the tip 31a of the nozzle 31 reaches the further lower position from the liquid surface height LS to the depth hS0 corresponding to the dispensing amount of the sample, in step ST408, the control unit 61a stops the descent of the nozzle 31 by controlling the drive unit 37 in step ST408.

In step ST409, the control unit 61a controls the pump and the like connected to the nozzle 31, and causes the nozzle 31 to suction a predetermined amount of the sample. Next, in step ST410, the drive unit 37 is controlled to raise the nozzle 31; in step ST411, the drive unit 38 is controlled to move the nozzle 31 to a position immediately above the other container 20 to which the sample is to be discharged. In step ST412, the control unit 61a controls the pump or the like connected to the nozzle 31 to discharge the sample to the other container 20, and ends the process.

Figure 18:
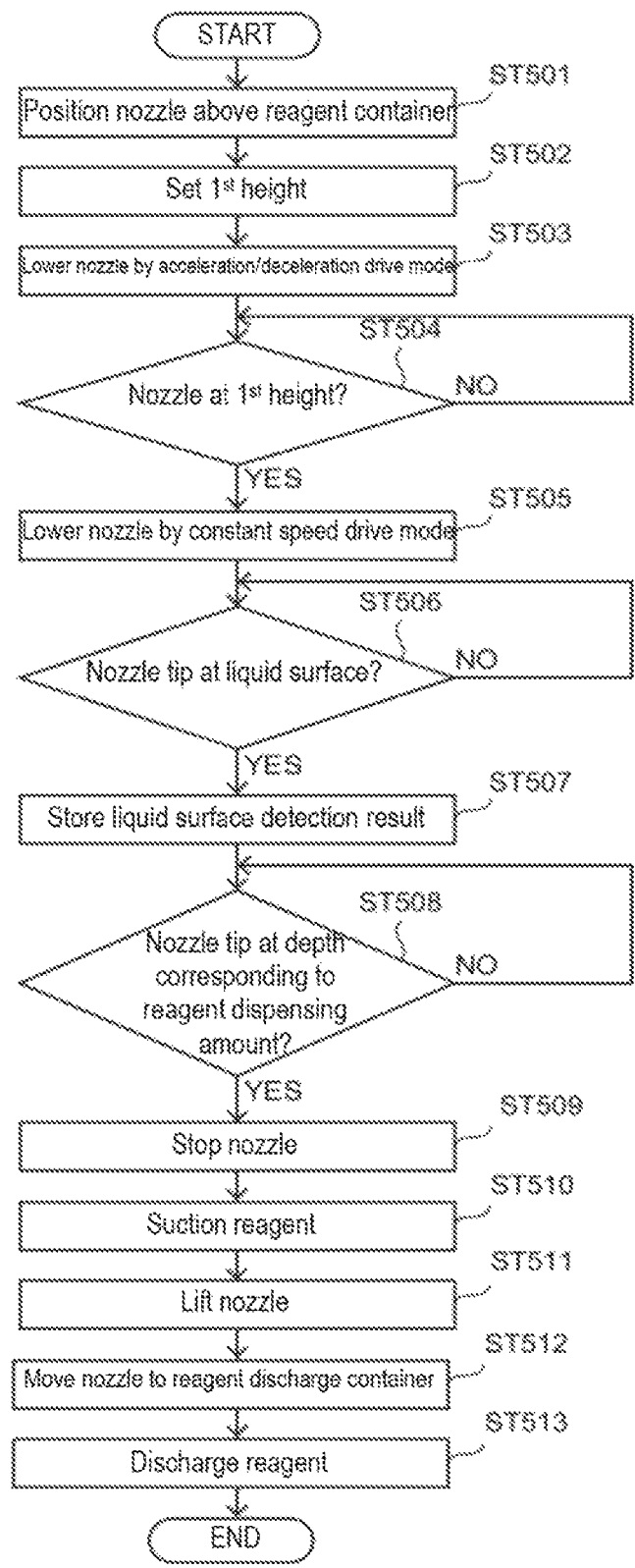
FIG. 18 is a flowchart showing a procedure of a reagent dispensing operation process.
Figure 19:
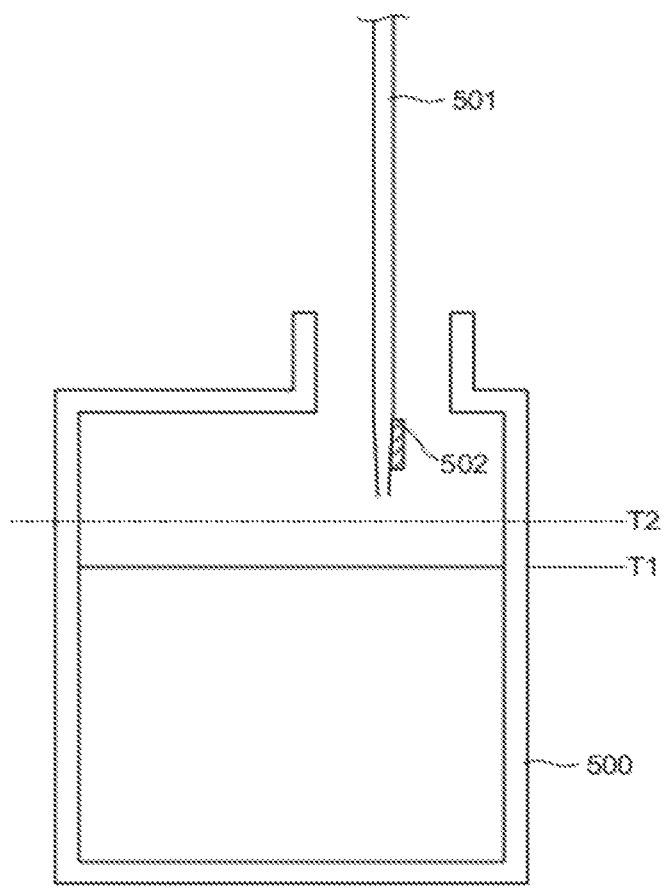
FIG. 19 is an explanatory diagram of a conventional technique.

FIG. 18 is a flowchart showing the procedure of the reagent dispensing operation process of step ST106 in FIG. 13. In step ST501 of FIG. 18, the control unit 61a drives the drive unit 38 of the reagent dispensing mechanism 161 to position the nozzle 31 just above the reagent container 131. In step ST502, the control unit 61a reads information on the number of pulses indicating the liquid surface height LR of the reagent stored in the storage unit 61b in step ST307 in FIG. 16, and sets the height a predetermined distance above the liquid surface height of the reagent as the first height hR1. When the reagent dispensing operation is performed for the second time or later, information on the number of pulses indicating the liquid surface height LR of the reagent after the last time is read from the storage unit 61b, and a height a predetermined distance from the liquid surface height of the reagent is set as the first height hR1. In step ST503, the control unit 61a drives the drive unit 37 to lower the nozzle 31 of the reagent dispensing mechanism 161 in the acceleration/deceleration drive mode. In step ST504, the control unit 61a determines from the number of pulses supplied to the stepping motor of the drive unit 37 whether the nozzle 31 has reached the first height hR1 stored in the storage unit 61b. When the tip 31a of the nozzle 31 has not reached the first height hR1, the control unit 61a repeats the step ST504 until the nozzle 31 reaches the first height hR1. Note that while the step ST504 is executed, the nozzle 31 is descending in the acceleration/deceleration drive mode.

When the nozzle 31 reaches the first height hR1, the process proceeds to step ST505. In step ST505, the control unit 61a controls the drive unit 37 to lower the nozzle 31 in the constant speed drive mode. While the nozzle 31 is being lowered in step ST505, in step ST506 the control unit 61a monitors the output signal from the sensor 35 and determines whether the tip 31a of the nozzle 31 has come into contact with the liquid surface. When the tip 31a of the nozzle 31 is not in contact with the liquid surface, the control unit 61a repeats the step ST506 until the tip 31a of the nozzle 31 comes into contact with the liquid surface. When the tip 31a of the nozzle 31 has made contact with the liquid surface, the process proceeds to step ST507, where the control unit 61a determines the number of pulses supplied to the stepping motor of the drive unit 37 when the tip 31a of the nozzle 31 contacts the liquid surface, and stores the number of pulses corresponding to the current liquid surface height LR at that time point in the storage unit 61b as the liquid surface detection result.

In step ST508, the control unit 61a determines from the number of pulses supplied to the stepping motor whether the tip 31a of the nozzle 31 has reached a position further downward from the liquid surface height LR by a depth hR0 corresponding to the dispensing amount of the reagent. When the tip 31a of the nozzle 31 has not reached the further lower position from the liquid surface height LR to the depth hR0 corresponding to the dispensing amount of the reagent, the control unit 61a calculates the dispensing amount of the reagent from the liquid surface height LR and repeats step ST 508 until the tip 31a of the nozzle 31 reaches a further lower position to the depth hR0 corresponding to the dispensing amount of reagent from the liquid surface height. Note that while the steps ST506 to ST508 are executed, the nozzle 31 is descending in the constant speed drive mode. When the tip 31a of the nozzle 31 reaches a further lower position from the liquid surface height LR to the depth hR0 corresponding to the dispensing amount of the reagent, the process proceeds to step ST509, and the control unit 61a controls the drive unit 37 to stop the descent of the nozzle 31.

In step ST510, the control unit 61a causes the nozzle 31 to suction a predetermined amount of reagent. In step ST511, the control unit 61a controls the drive unit 37 to raise the nozzle 31; in step ST 512, the control unit 61a controls the drive unit 38 to position the other container 20 the nozzle 31 to the other container 20 to which the reagent is to be discharged. In step ST513, the control unit 61a controls the pump or the like connected to the nozzle 31 to discharge the reagent to the other container 20, and ends the process.

The sample measuring method according to this aspect includes a step of suctioning a first liquid based on the liquid surface detection result of the first liquid detected when the nozzle (31) descends at a first speed, a step of suctioning a second liquid based on a liquid surface detection result of the second liquid detected when the nozzle (31) descends at a second speed that is faster than the first speed, and a step of measuring a measurement sample prepared with the suctioned first liquid.

Although the embodiment of the present invention has been described above, the present invention is not limited to the above embodiment inasmuch as various modifications are possible without departing from the scope of the present invention.

What is claimed is:

1. A sample measuring apparatus comprising:
   a nozzle;
   a liquid storage unit;
   a sensor configured to detect a liquid surface of a first liquid and a liquid surface of a second liquid;
   a motor configured to drive the nozzle; and
   a control apparatus for controlling a sample measuring apparatus, the control apparatus comprising:
   non-transitory memory storing instructions executable to measure a sample; and
   a controller configured to execute the instructions to:
   cause the nozzle to be lowered to a container;
   detect the liquid surface of the first liquid in the container while causing the nozzle to be lowered at a first speed;
   cause the nozzle to stop being lowered based on the detected liquid surface of the first liquid;
   cause the nozzle to suction the first liquid in the container;
   cause the nozzle to move from the container to the liquid storage unit located at a different position from the container;
   cause the nozzle to lower to the liquid storage unit;
   detect the liquid surface of the second liquid in the liquid storage unit while causing the nozzle to be lowered at a second speed;

cause the nozzle to stop being lowered based on the detected liquid surface of the second liquid;
cause the nozzle to suction the second liquid in the liquid storage unit; and
cause measurement of a measurement sample prepared from the first liquid to commence;
wherein the second speed is faster than the first speed.

2. The sample measuring apparatus according to claim 1, wherein the controller is configured to:
cause a cleaning liquid to be used as the second liquid to clean the nozzle.

3. The sample measuring apparatus according to claim 1, wherein the controller is configured to:
cause the nozzle to be lowered with respect to the second liquid by an acceleration/deceleration drive mode including each period of acceleration, constant speed, deceleration; and
detect the liquid surface of the second liquid during the deceleration period of the acceleration/deceleration drive mode.

4. The sample measuring apparatus according to claim 1, wherein the controller is further configured to:
cause a fixed amount of the second liquid to be stored in the liquid storage unit;
store, in the non-transitory memory, a liquid surface height of the second liquid in the liquid storage unit; and
cause the nozzle to be lowered to a height below the liquid surface height of the fixed amount of the second liquid stored in the liquid storage unit.

5. The sample measuring apparatus according to claim 1, wherein the controller is configured to:
cause a sample or a reagent to be used as the first liquid.

6. The sample measuring apparatus according to claim 1, wherein the controller is configured to:
cause whole blood contained in a sample container to be centrifuged to separate plasma; and
cause the plasma to be used as the first liquid.

7. The sample measuring apparatus according to claim 1, wherein the controller is configured to:
cause the nozzle to be lowered with respect to the first liquid by an acceleration/deceleration drive mode including acceleration, constant speed, and deceleration;
cause the nozzle to be lowered by a constant speed drive mode at a constant speed, and in the constant speed drive mode; and
detect the liquid surface of the first liquid while causing the nozzle to be lowered.

8. The sample measuring apparatus according to claim 1, wherein the controller is configured to:
cause the first liquid and the second liquid to be suctioned when the liquid surface detection result of the first liquid and the second liquid is within a predetermined range, respectively.

9. The sample measuring apparatus according to claim 8, wherein the controller is configured to:
output information indicating abnormality and stop measurement when the liquid surface detection result of the first liquid or the second liquid is not within the predetermined range.

10. The sample measuring apparatus according to claim 9, wherein the controller is further configured to:
cause a fixed amount of the second liquid to be stored in the liquid storage unit;
cause a liquid supply unit to supply the fixed amount of the second liquid to the liquid storage unit;
cause the second liquid stored in the liquid storage unit to be discharged from the liquid storage unit;
output information indicating a supply abnormality of the second liquid as information indicating the abnormality when the liquid surface detection result of the second liquid exceeds a lower limit of the predetermined range; and
output information indicating a discharge abnormality of the second liquid as information indicating the abnormality when the liquid surface detection result exceeds an upper limit of the predetermined range.

11. The sample measuring apparatus according to claim 2, wherein the controller is further configured to:
cause an amount of the cleaning liquid to be stored in the liquid storage unit; and
cause the suctioned cleaning liquid to be discharged to the liquid storage unit.

12. The sample measuring apparatus according to claim 11, wherein the controller is further configured to:
cause the cleaning liquid stored in the liquid storing unit to be discharged after the cleaning liquid is suctioned.

13. The sample measuring apparatus according to claim 1, wherein the controller is configured to:
cause a stepping motor to raise and lower the nozzle; and
use the number of pulses of pulse signal supplied to the stepping motor when the liquid surface is detected as the liquid surface detection result.

14. The sample measuring apparatus according to claim 1, wherein the controller is configured to:
detect the liquid surface of each of the first liquid and the second liquid by detecting a contact between the nozzle and each of the first liquid and the second liquid.

15. The sample measuring apparatus according to claim 1, wherein the controller is configured to:
use an electrostatic capacity sensor to detect the liquid surfaces of the first liquid and the second liquid.

16. The sample measuring apparatus according to claim 1 wherein
the first liquid is a sample or a reagent; and
the second liquid is a cleaning liquid for cleaning the nozzle,
wherein the controller is configured to:
cause the nozzle to be lowered by an acceleration/deceleration drive mode including a period of acceleration, constant speed, and deceleration with respect to the second liquid;
detect the liquid surface of the second liquid during the deceleration period of the acceleration/deceleration drive mode;
cause the nozzle to be lowered by the acceleration/deceleration drive mode including acceleration, constant speed, and deceleration with respect to the first liquid;
cause the nozzle to be lowered by a constant speed drive mode which is a constant speed; and
detect the liquid surface of the first liquid during the descent of the nozzle.

17. The sample measuring apparatus according to claim 1, wherein the controller is further configured to:
cause a fixed amount of the second liquid to be stored in the liquid storage unit; and
cause the nozzle to be lowered to a height below a liquid surface of the fixed amount of the second liquid stored in the liquid storage unit,
wherein the first liquid is a sample or a reagent, and the second liquid is a cleaning liquid for cleaning the nozzle.

18. The sample measuring apparatus according to claim 4, wherein the controller is configured to:
  cause a cleaning tank to store the fixed amount of the second liquid.

19. The sample measuring apparatus according to claim 10, wherein
  the liquid supply unit is a tube connected to the liquid storage unit.

* * * * *